United States Patent [19]

Dunn et al.

[11] Patent Number: 4,761,796
[45] Date of Patent: Aug. 2, 1988

[54] HIGH FREQUENCY SPREAD SPECTRUM COMMUNICATION SYSTEM TERMINAL

[75] Inventors: James Dunn, San Diego, Calif.; Charles Sanford, Iselin; Joseph Kadin, Florham Park, both of N.J.

[73] Assignee: ITT Defense Communications, Nutley, N.J.

[21] Appl. No.: 694,549

[22] Filed: Jan. 24, 1985

[51] Int. Cl.[4] .......................................... H04L 27/30
[52] U.S. Cl. ......................................... 375/1; 380/34
[58] Field of Search ...................... 375/1, 107; 381/43; 380/34

[56] References Cited

U.S. PATENT DOCUMENTS

| 4,247,947 | 1/1981 | Miyamoto | 381/43 |
| 4,287,597 | 9/1981 | Paynter et al. | 375/107 |
| 4,435,822 | 3/1984 | Spencer et al. | 375/1 |
| 4,606,041 | 8/1986 | Kadin | 375/1 |

Primary Examiner—Cangialosi, Salvatore
Assistant Examiner—Aaron J. Lewis
Attorney, Agent, or Firm—Robert A. Walsh; Thomas N. Twomey; Mary C. Werner

[57] ABSTRACT

The spread spectrum communication system terminal comprises a first subsystem including a first arrangement to encode a locally generally digital data with an error correcting code, a second arrangement for spectrum spreading of the encoded locally generated digital data in at least one mode of operation of the communication system terminal, a third arrangement to receive remotely generated error correcting code encoded digitla data spectrum spread in the one mode of operation and a fourth arrangement to recover the remotely generated digital data. In addition, a second subsystem includes a fifth arrangement frequency hopping the encoded locally generated digital data prior to transmission to a remote location and a sixth arrangement frequency dehopping the encoded remotely generated digital data received from the remote location. A third subsystem is also provided including a seventh arrangement to provide a predetermined signal for spectrum spreading the encoded locally generated digital data in the one mode of operation and to couple the encoded locally generated digital data to the fifth arrangement and an eighth arrangement to provide a reference frequency for the frequency hopping and frequency dehopping and to couple the frequecny dehopped encoded remotely generated digital data from the sixth arrangement to the third arrangement.

8 Claims, 15 Drawing Sheets

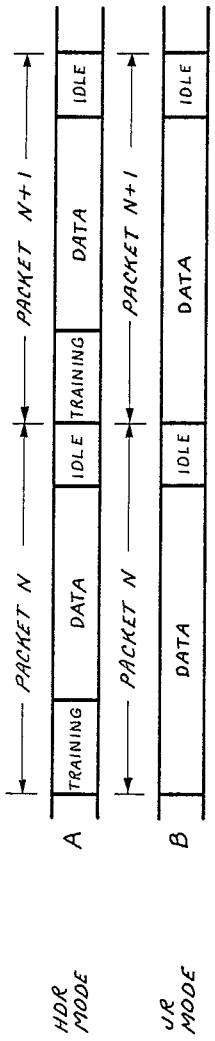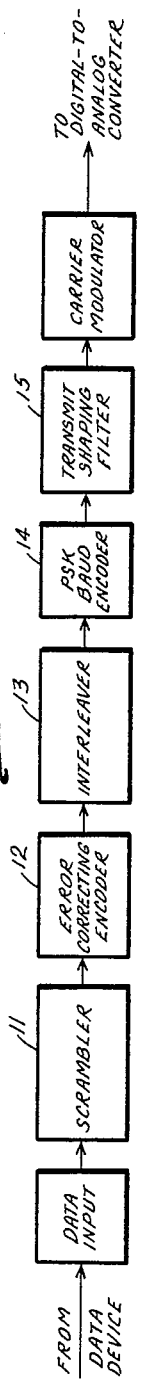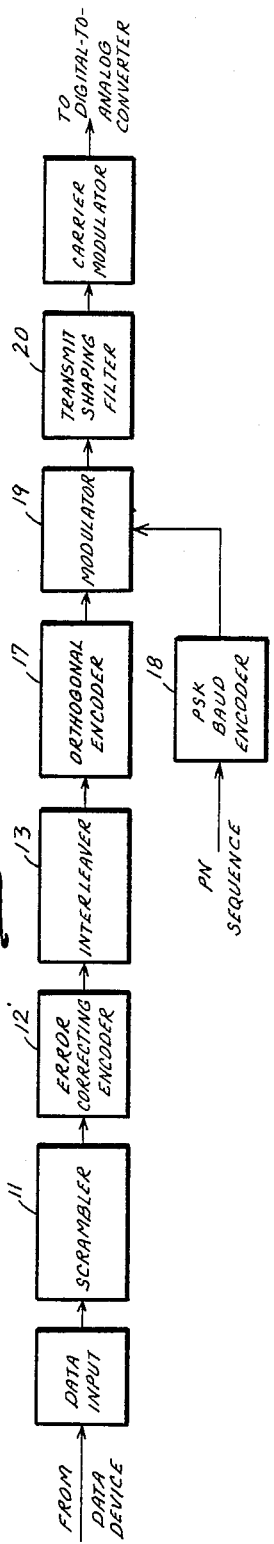

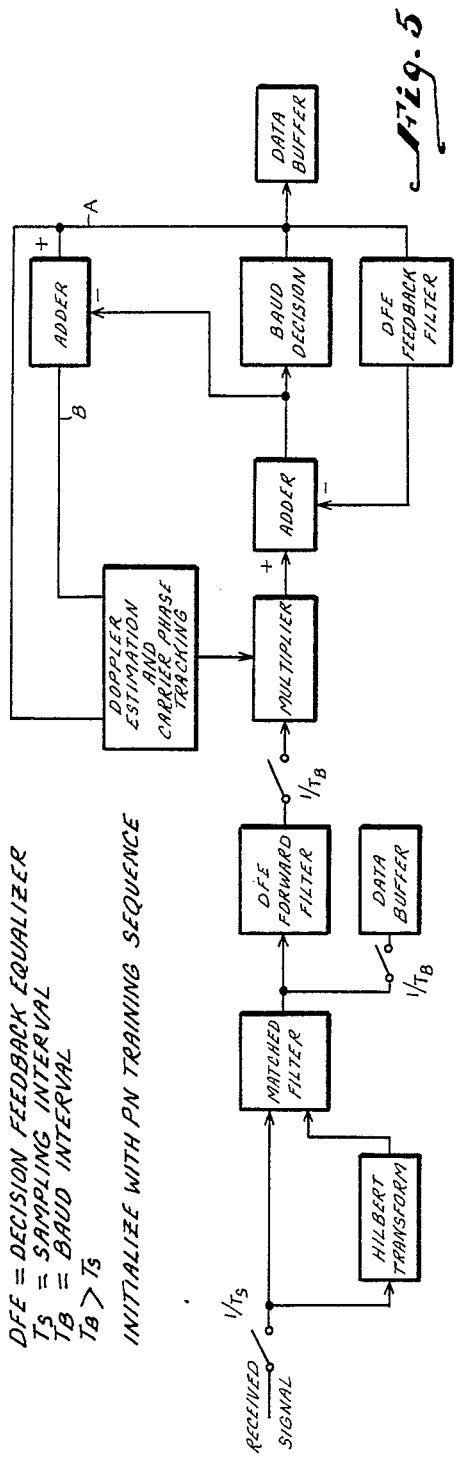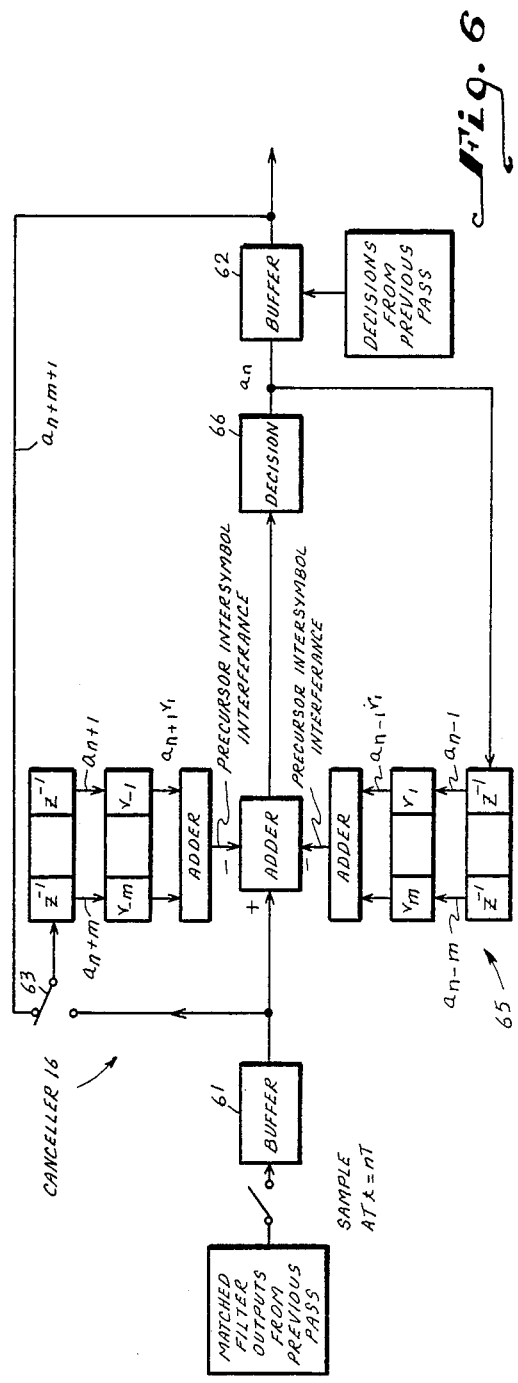

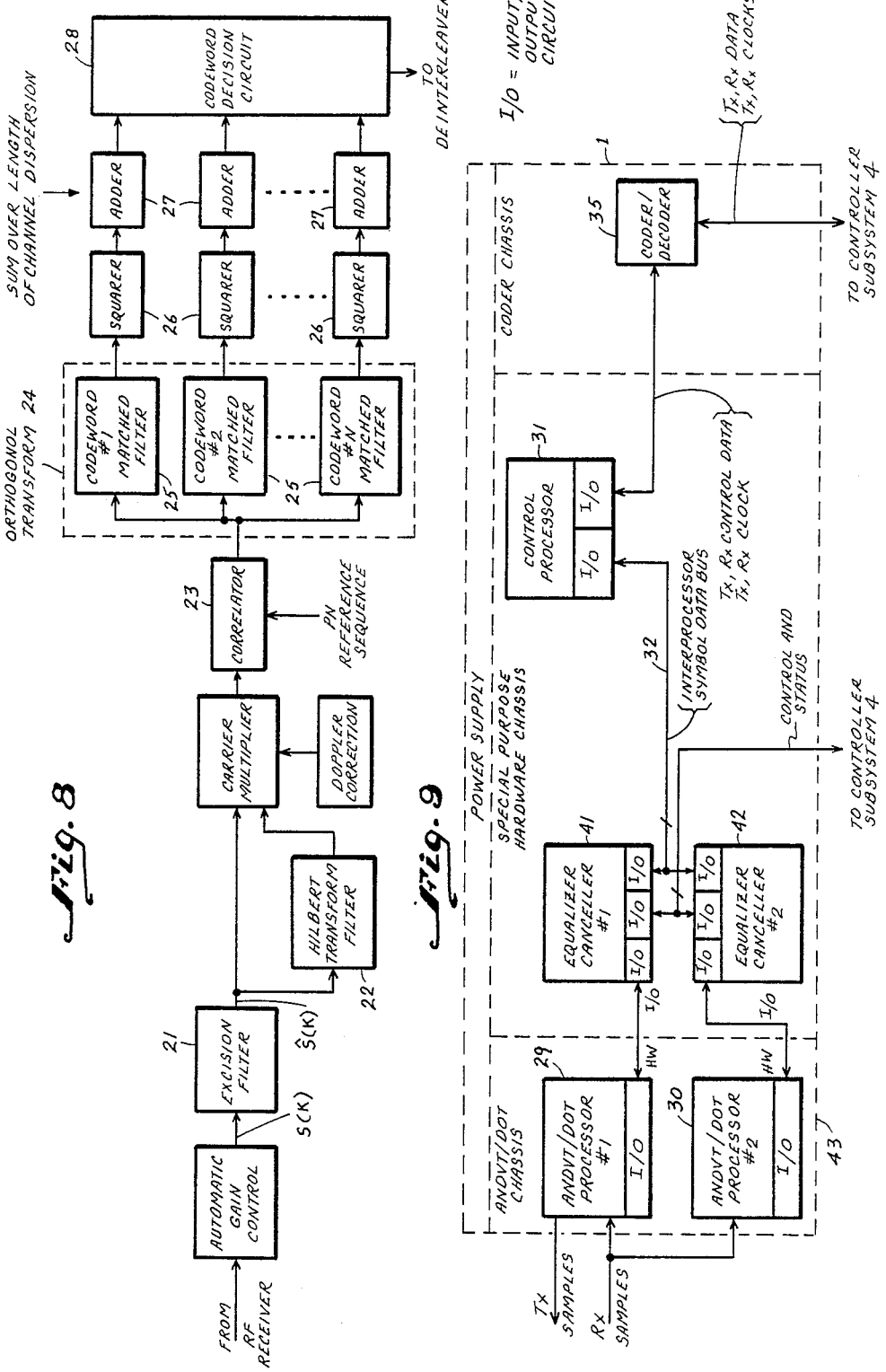

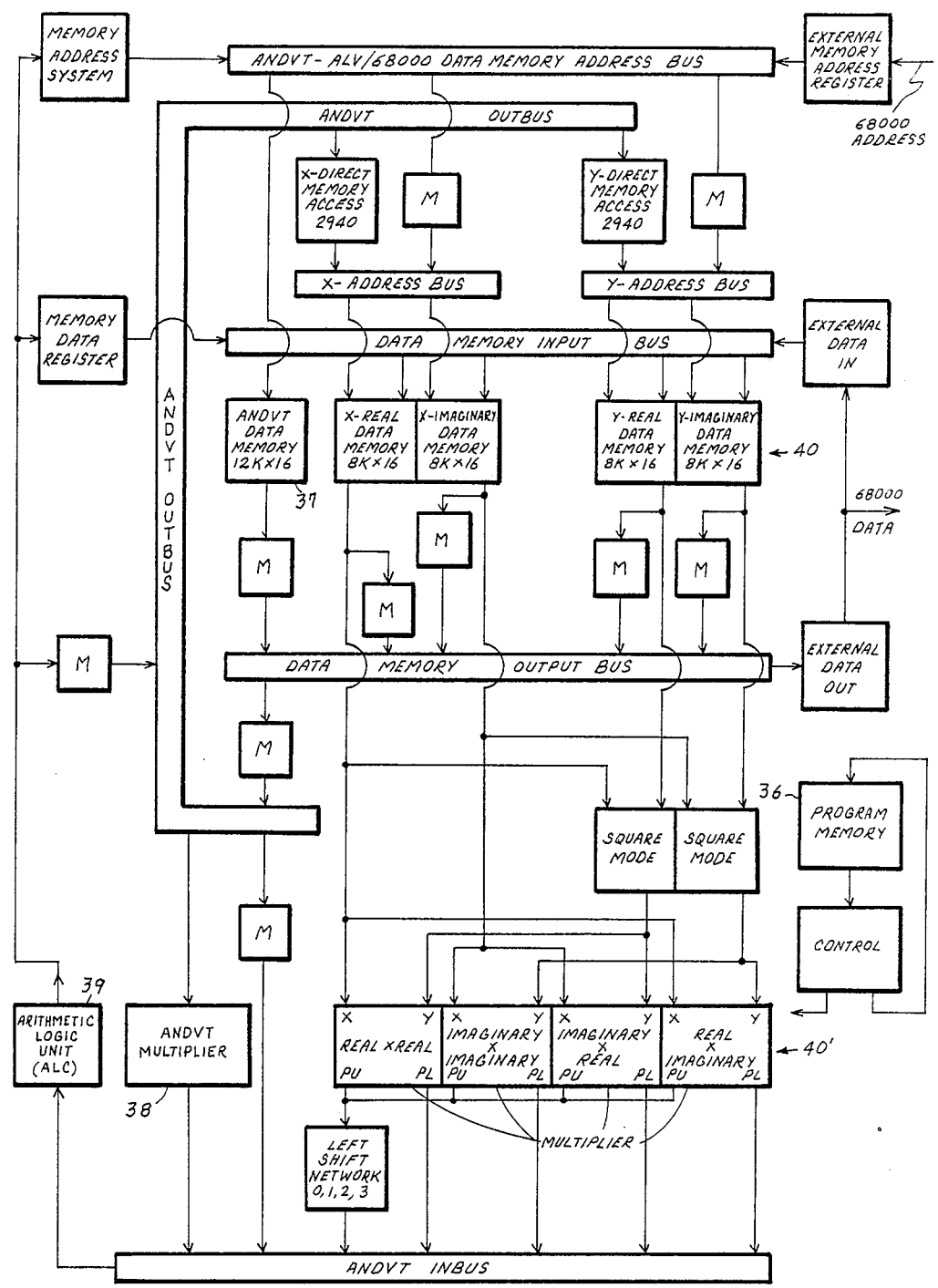

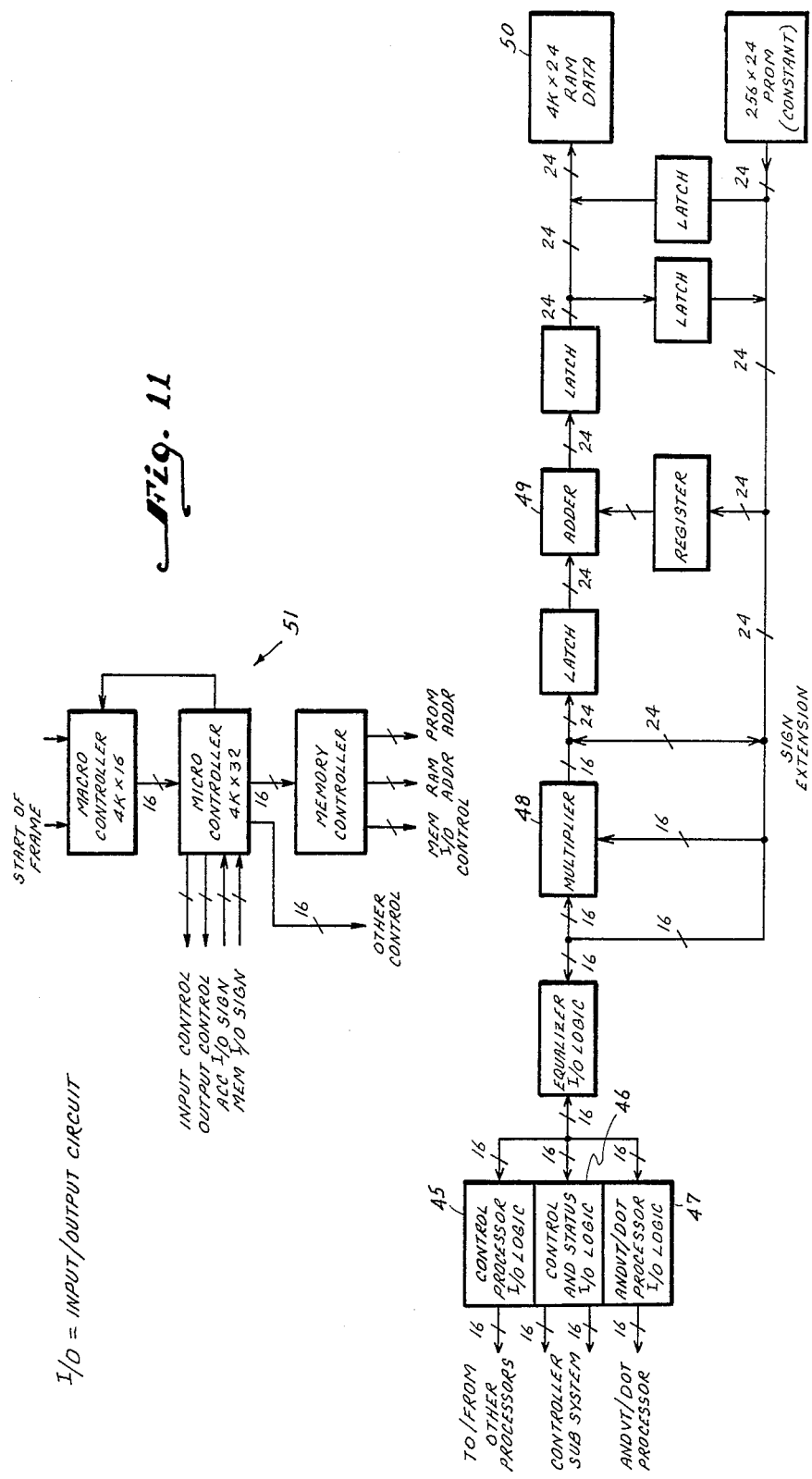

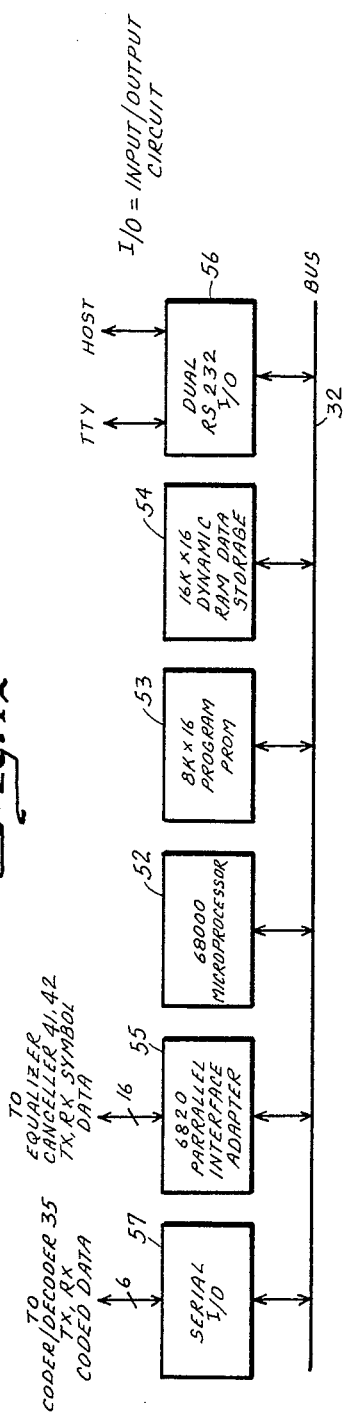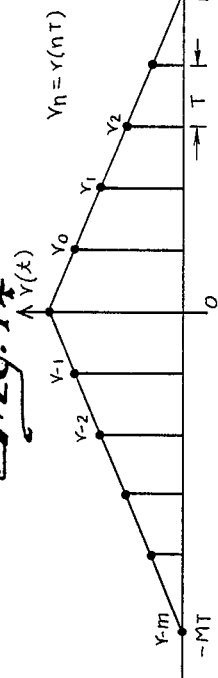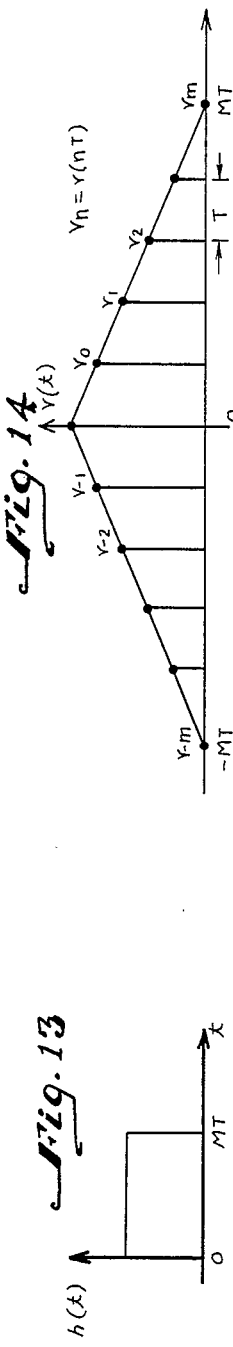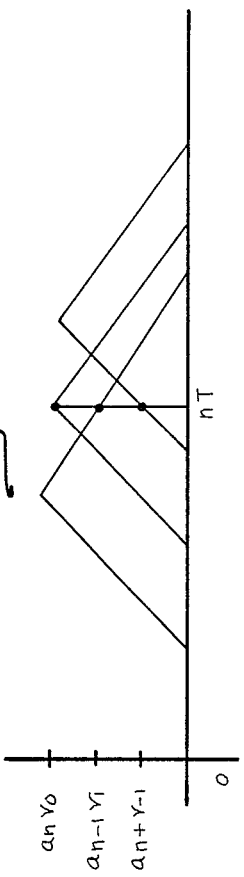

ns and more particularly to a spread spectrum
HIGH FREQUENCY SPREAD SPECTRUM COMMUNICATION SYSTEM TERMINAL The Government has rights in this invention persuant to Contract No. F30602-83-C-0195 awarded by Rome Air Development Center, Department of the Air Force.

BACKGROUND OF THE INVENTION

The present invention relates to data communication systems and more particularly to a spread spectrum communication system terminal including sequence spreading and frequency hopping.

Spread spectrum communication systems have been used in a variety of fields. In the communication system of this type, the transmitted bandwidth is much greater than the bandwidth or rate of the information to be transmitted. The carrier signal is modulated by some other function to widen or spread the bandwidth for transmission. The received signal is remapped into the original information bandwidth to reproduce a desired signal. The spread spectrum communication system has many useful advantages: a selective call is possible; since the power spectrum density is low, private communication is allowed; and it is little influenced by interference either due to multipath fading or jamming. From this standpoint, the spread spectrum system has found many uses, such as mobile communication systems, avionic systems, satellite communications, scatter communication systems of both the ionospheric and tropospheric type, direction finders and distance measuring equipment.

The spread spectrum systems can be categorized into a direct sequence system, a frequency hopping system, a time hopping system and a hybrid system which is a proper combination of the systems just mentioned. Of these systems, the frequency hopping systems is frequently used in the field of mobile communication systems with a low traffic volume for a number of stations. Also frequency hopping systems can be employed in satellite communication systems and scatter type communication systems where a fading environment is present.

In the frequency hopping system a carrier frequency is shifted or jumped in discreet increments in a pattern dictated by a prepared code of sequence, for instance, a PN (psudo-noise), and M-sequence codes, Gold codes and the like, in synchronism with a change in the state of the codes. The resulting consecutive and time sequential frequency pattern is called a hopping pattern and the duration of each hopping frequency is called a chip. The transmitted information is embedded in the codes or embedded in each frequency of the carrier wave by a so-called FSK (frequency shift keyed) modulation. The information signal thus spread-spectrum-modulated can be reproduced at the receiver.

In reproducing the information signal at the receiver, a synchronization acquisition process is first performed, in which the code pattern provided in the receiver is made accurately coincident with the code pattern generated in the transmitter in time position. Then, the spread spectrum signal is despread, and thereafter a well known demodulation is performed to extract the desired information. More particularly, a local reference signal of a frequency correspondingly determined by the same code pattern as that in the transmitter for every chip and the received signal are mixed in a mixer in order to perform a correlation (despreading) process for converting the spread spectrum signal into the signal having a frequency bandwidth wide enough to extract the information. This system is described in detail in "Spread Spectrum Systems" by R. C. Dixon published by John Wiley and Sons, Inc. in 1976. Following this despreading process, the desired information is extracted by usual demodulation techniques.

It is also known to employ a direct sequence system again employing a PN code, M-sequence codes, Gold codes and the like to spread the transmitted information over the bandwidth of the system and to again employ correlation technique at the receiver to recover the information.

Such systems are not only useful in obtaining a proper coherent transmission in a fading environment, such as is present in mobile communication, satellite communications and scatter communication, the systems are also jammer resistant.

High frequency radio data communication systems have gained increasing importance in recent years where it is used for long distance radio contact as a backup or adjunct to satellite networks. As the high frequency band (2–30 megahertz (MHZ)) is more widely used, the need for reliable high frequency communication links increases. To improve the performance of data modems in terms of bit error rates, recovery from fade dropouts, intersymbol interface due to multipath dispersion effects, and immunity to interference state of the art equalization and error correction techniques must be applied. In addition, spread spectrum signal processing techniques are required to provide antijam capability and low probability of intercept capability.

SUMMARY OF THE INVENTION

An object of the invention is to provide an improved high frequency radio data communication system.

Another object of the present invention is to provide a high frequency radio data communication system terminal employing an improved modem subsystem which improves the performance in terms of bit error rate, recovery from fade dropouts, intersymbol interface due to multipath dispersion effects, and immunity to inteference employing equalization and error correcting techniques in addition to spread spectrum signal processing techniques.

Still another object of the present invention is to provide a high frequency spread spectrum communication terminal having improved performance in terms of bit error rate, recovery from fade dropouts, intersymbol interface due to multipath dispersion effects, and immunity to inteference employing equalization and error correcting techniques in addition to spread spectrum signal processing techniques to provide antijam capability and low probability of intercept.

A feature of the present invention is the provision of a spread spectrum communication system terminal comprising: a first subsystem including first means to encode locally generated digital data with an error correcting code, second means coupled to the first means for spectrum speading of the encoded locally generated digital data in at least one mode of operation of the communication system terminal, third means to receive remotely generated error correcting code encoded digital data spectrum spread in the one mode of operation, and fourth means coupled to the third means to recover the remotely generated digital data; a second subsystem including fifth means frequency hopping the encoded locally generated digital data prior to transmission to a remote location, and sixth means frequency dehopping the encoded remotely generated digital data received from the remote location; and a third subsystem including seventh means coupled to the second means and the fifth means to provide a predetermined signal for spectrum spreading of the encoded locally generated digital data in the one mode of operation and to couple the encoded locally generated digital data to the fifth means, and eighth means coupled to the third means and the sixth means to provide a reference frequency for the frequency hopping and the frequency dehopping and to couple the frequency dehopped encoded remotely generated digital data from the sixth means to the third means.

Another feature of the present invention is the provision of providing in a communication system employing frequency hopping and spread spectrum techniques, a modem subsystem comprising: first means to encode locally generated digital data with an error correcting code, second means coupled to the first means for spectrum spreading of the encoded locally generated digital data in at least one mode of operation of the communication systems and to couple resultant digital data to a radio frequency subsystem for frequency hopping, third means coupled to the radio frequency subsystem to receive remotely generated error correcting code encoded digital data spectrum spread in the one mode of operation and frequency dehopped in the radio frequency subsystem, and fourth means coupled to the third means to recover the remotely generated digital data.

BRIEF DESCRIPTION OF THE DRAWING

The above-mentioned and other objects and features of the present invention and the manner of obtaining them will become more apparent by reference to the following description taken in conjunction with the drawing, in which

FIG. 2 illustrates the packet transmission format for each of the two modes of operation of the communication system terminal of FIG. 1;

FIG. 3 is a block diagram illustrating the algorithm for the high data rate (HDR) transmission function of the terminal of FIG. 1;

FIG. 5 is a block diagram illustrating the algorithm for the first pass in the decision feedback equalizer for the HDR mode of operation of the terminal of FIG. 1;

FIG. 6 is a block diagram illustrating the algorithm of the second and third pass for the equalizer canceller in the HDR mode of operation of the terminal of FIG. 1;

FIG. 7 is a block diagram illustrating the algorithm for the transmission function of the terminal of FIG. 1 in the JR (jam resistant) mode of operation thereof;

FIG. 8 is a block diagram illustrating the algorithm of the receiving function of the terminal of FIG. 1 in the JR mode of operation thereof;

FIG. 9 is a lot more detailed block diagram of the modem subsystem of FIG. 1;

FIG. 10 is a general block diagram of the ANDVT/DOT processors of FIG. 9;

FIG. 11 is a block diagram of the equalizer canceller of FIG. 9;

FIG. 12 is a block diagram of the control processor of FIG. 9;

FIG. 13 is a waveform illustrating the overall impulse response of the transmit filter and channel;

FIG. 14 is a waveform illustrating the overall impulse response of the transmit filter, channel and matched filter of the terminal of FIG. 1;

FIG. 15 is a waveform illustrating intersymbol interference;

DESCRIPTION OF THE PREFERRED EMBODIMENT

Figure 1:
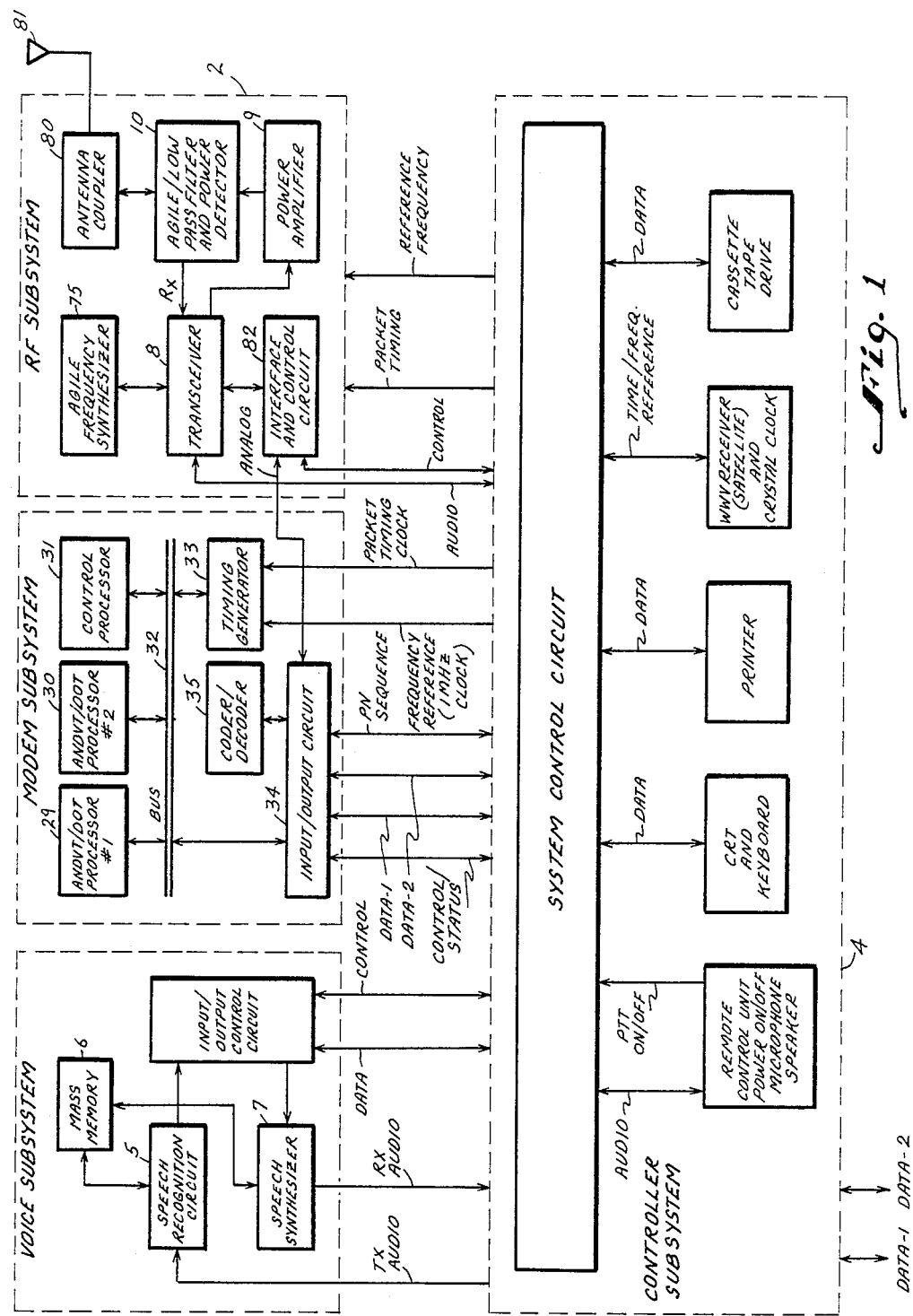
FIG. 1 is a basic block diagram of the spread spectrum communication system terminal in accordance with the principals of the present invention.

Refering to FIG. 1, there is illustrated therein a general block diagram of a terminal for a high frequency spread spectrum communication system in accordance with the principals of the present invention. The terminal includes a modem subsystem 1 which uses state of the art equalization techniques and spread spectrum signal processing. The terminal of the communications system provides for 4800 bits per second and 2400 bits per second data communication on 6 kHz (kilohertz) and 3 kHz high frequency channels with frequency hopping by the radio frequency (RF) transmitter/receiver which is contained in the RF subsystem 2. Frequency hopping combined with decision feedback equalization, linear intersymbol interference cancellation, error correction and interleaving in the model subsystem 1 gives frequency diversity and antijam capability. Very low bit rate voice communication via voice recognition in voice subsystem 3 is also provided by the high frequency communication system terminal. In this mode of operation the modem subsystem 1 uses PN spreading to utilize the full bandwidth that is available and provide additional antijam capability. The frequency hopping/PN technique also gives low probability of intercept capability if low transmission powers are used.

The high frequency communication system provides the following capabilities:

(1) 2400 bits/second and 1200 bits/second data communication in a 3 kHz bandwidth high frequency channel, (2) 4800 bits/second data communication in a 6 kHz bandwidth high frequency channel, (3) low bit rate data communication with PN spreading to the specified channel bandwidth, (4) frequency hopping operation during communication at all of the above data rates and channel bandwidths and, (5) voice recognition of discrete utterances from a fixed vocabulary to enable low bit rate voice communication.

The communication terminal shown in FIG. 1 of the communication system includes a controller subsystem 4 in addition to modem subsystem 1, RF subsystem 2 and voice subsystem 3. Each subsystem performs as a stand alone function witn a well defined flexible interface. This allows for the possibility of taking a given subsystem and using it to perform a similar function in a different communication system. The controller subsystem 4 provides overall centralized control of the terminal and monitors the other subsystems through control/status lines. Controller 4 performs the tasks of system initialization, mode set up, interconnection between peripherial devices in different subsystem, performance testing and data recording. Packet timing is generated in controller 4 through the use of a crystal clock with an accuracy of $2 \times 10^{-10}$. This timing is synchronized to the NOAA "GOES" satellite and compensated for signal propagation delay. Additional tasks for controller 4 are the generation of a PN stream and the control of the RF frequency hopping operation.

Low bit rate digital speech is generated by voice subsystem 3 by voice recognition. Voice subsystem 3 accepts speech input from a microphone and produces digital data code words from a fixed vocabulary which corresponds to the recognized utterances in speech recognition circuit 5 and mass memory 6. On the receive side, voice subsystem 3 accepts digital data and synthesizes audio signals corresponding to the transmitted utterances in speech synthesizer 7 and mass memory 6. Voice subsystem 3 is trained by the speaker on a vocabulary of 255 utterances. Templates for up to four speakers can be stored in memory 6. The recognition accuracy is 96% in a laboratory environment. Subsystem 3 uses an Intel bubble memory with four million bits per cartridge for mass storage, 68000 microprocessors for recognition in circuit 5 and a TMS 32010 processor in synthesizer 7 for digital filtering of the audio signals.

Modem subsystem 1 accepts digital data at rates up to 4800 bits/second. This data is encoded with an error correcting code interleaved to minimize the effects of burst errors, grouped into packets, encoded into an eight phase complex symbol digital filtered at baseband and modulated on to a carrier, sent to an analog to digital converter and output to RF subsystem 2. On the received side, modem subsystem 1 removes narrowband inteferrence and compensates for the time disperrsion and fading of the high frequency medium as well as reversing the action of the transmitter. Details of modem subsystem 1 will be described hereinbelow.

RF subsystem 2 provides a frequency hopping high frequency amplifier of transceiver 8 for data communication as well as normal single sideband (SSB) voice operation in the 2–30 MHZ band. The SSB voice operation is USB (upper side band), LSB (lower side band), or ISB (intermediate side band). The receiver of transceiver 8 has a dynamic range from −110 dBM (decibel) to −10 dBM with a 10 dBS signal to noise ratio at −110 dBM. Automatic gain control for transceiver 8 can be operated automatically or by external selection. Data modes provide 3 or six kHz bandwidths. Frequency hopping steps are 6.25 hz (hertz) increments with a settling time of 1 milliseconds (ms). The power amplifier 9 provides 300 watts with an angle low pass filter and power detector 10 to surpress harmonics.

The signal processing in modem subsystem 1 can be described by two different sets of algorithms. The high data rate (HDR) algorithms are used when the data rates are 4800 bits/seconds, 2400 bits/seconds or 1200 bits/seconds. The jam resistant (JR) algorithms are used when the input data rates are low and PN spreading is performed to provide spread spectrum advantage. Frequency hopping is used in both the HDR and JR modes of operation. Modem subsystem 1 processes data in blocks which are called packets. The packet formats for the two modes of operation are shown in FIG. 2. Packet lengths are fixed and all of the data from any single packet are transmitted at a single frequency.

Figure 4:
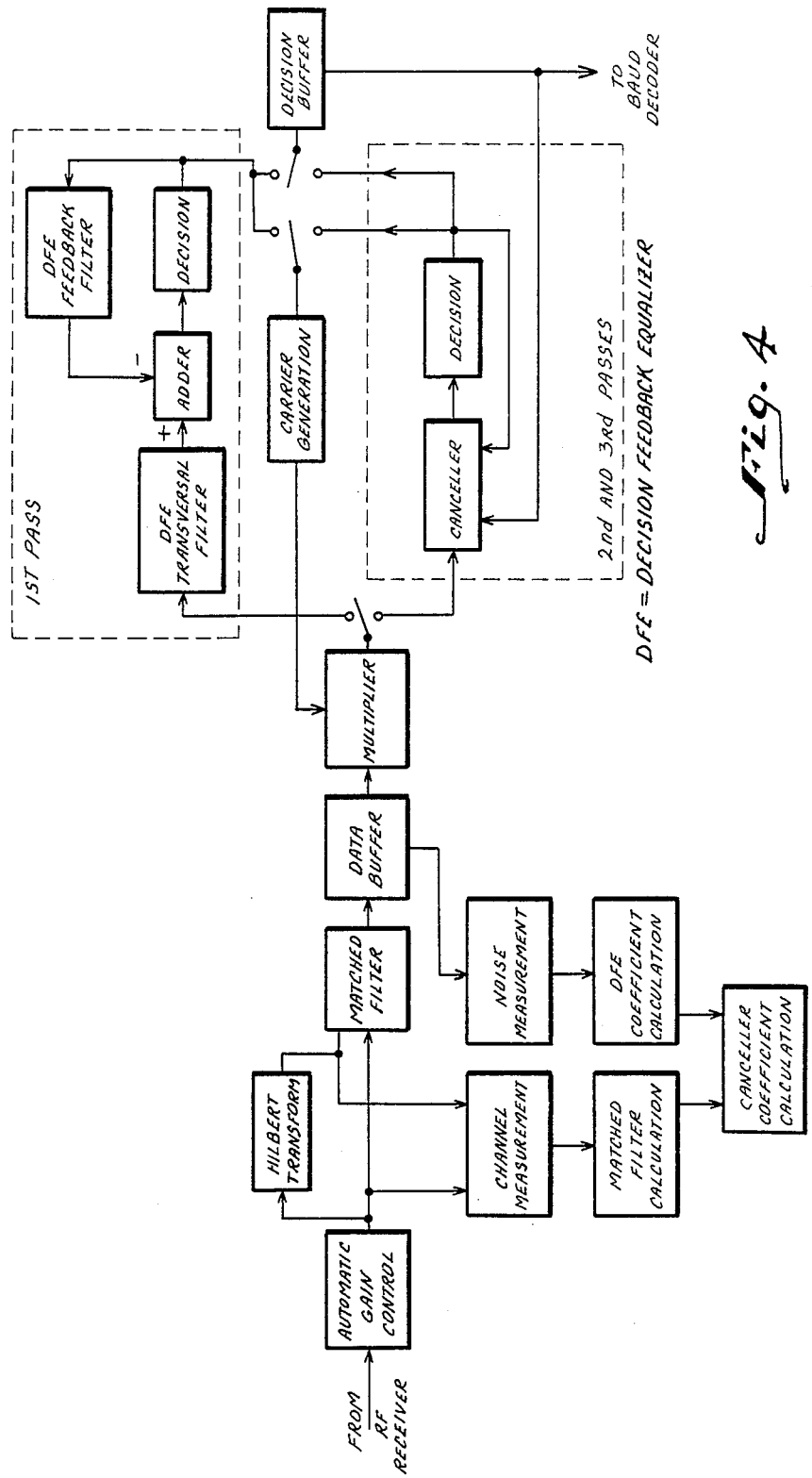
FIG. 4 is a block diagram illustrating the algorithm for the HDR mode for the receiving operation of the terminal of FIG. 1.

FIG. 3 shows the algorithm for the transmitter function for the HDR mode. The data bits are scrambled in scrambler 11 to insure randomness over a packet interval, then they are passed through a error correction encoder 12 which is followed by an interleaving algorithm in interleaver 13. Next, PSK (phase shift key) modulation is performed in encoder 14 and the modulated signal is filtered in transmit shaping filter 15. The filter characteristics of filter 15 are chosen to limit the peak to RMS (root mean square) power ratio of the transmitted signal to less than 2 dB and to restrict the bandwidth of the transmitted signal. The filter impulse response is given by the expression:

$$h(k) = \sin(pi\ k\ b)/(pi\ k\ b) \cos(pi\ a\ k\ b)/(1. - (2\ a\ k\ b)^2) \quad (1)$$

where,
k is the sample index
a is a constant between 0 and 1
b is a constant related to the product of the sampling interval and the filter 3 dB bandwidth At the beginning of each packet a training sequence is transmitted. This sequence is used by the demodulator to calculate the HF channel impulse response. The algorithm for the receiving functon in the HDR mode is shown in FIG. 4. A non-iterative form of equalization is used to compensate for the mutipath effects of the HF propagation channel. The equalization and demodulation are perfomed in a two pass process on each packet of data. First, the training sequence is used to calculate the coefficients for a decision feedback equalizer (DFE) and a matched filter. The received data samples are passed through the DFE and a set of decisions for an entire packet of data is stored. Next, a set of coefficients for a linear canceller is calculated and the received data samples are passed through the canceller and the set of DFE decisions is used to cancel intersymbol interference. The operations performed on the first pass are diagrammed in FIG. 5. In the first operation the training sequence is used to estimate the high frequency channel impulse response. The training sequence is a complex PN sequence of length N with a cyclic autocorrelation function given by:

$$R(k - m) = N \text{ for } k = m \quad (2)$$
$$= 0 \text{ for } k <> m$$

Two period of the training sequence are transmitted. The received signal samples are correlated with a modulated replica of the training sequence. The result of this correlation is an estimate of the channel impulse response. The channel impulse response estimate is given by:

$$h(k) = \underset{n=0}{\overset{N}{\text{SUM}}} [s(k + n)pt(n)] \quad (3)$$

where, s(n) = nth complex sample of received signal
pt(n) = nth complex sample of training sequence
N = length of training sequence Using the coefficients h(k), tap weights for a matched filter and a DFE can be calculated. The matched filter coefficients are $$f(k) = h^*(JM - k) \quad (4)$$

where,

M = length of the channel impulse response in symbols,
J = ratio of sample rate to symbol rate, and
h*(n) = complex conjugate of h(n).

The optimum DFE forward filter coefficients can be computed by solving the set of linear equations for u(n) as given by Mueller and Salz, "A Unified Theory of Data-Aided Equalization," Bell System Technical Journal, Vol. 60, No. 9, pp. 2023–2039, November 1981:

$$\underset{n=0}{\overset{m}{\text{SUM}}} [u(n) X(k - n)] = X(k) \text{ for } k = 0, 1 \ldots, M \quad (5)$$

where, (6)

u(n) = nth DFE forward filter parameter, $$X(m) = \underset{n=0}{\overset{JM}{\text{SUM}}} [h(n)h^*(JM + n)] \text{ for } m = 1, \ldots, M,$$

$$X(0) = \underset{n=0}{\overset{JM}{\text{SUM}}} [h(n)h^*(n)] + NP, \quad (7)$$

j = ratio of sampling rate to symbol rate, and

NP = received noise power.

The DFE forward filter coefficients, c(n), are given by the equations:

c(0) = (1 − u(0))/NP, and c(n) = −u(n)/NP for n = 1, ..., M.

The set of linear equations in (5) can be solved directly for c(n) by making a change of variable to give:

$$\underset{n=0}{\overset{M}{\text{SUM}}} [c(n)x(k - n)] = Y(k) \text{ for } k = 0, 1, \ldots, M \quad (7a)$$

where

Y(0) = 1.0, and (7b)
Y(k) = 0.0 for k = 1, 2, ..., M.

This is a hermetian set of linear Toeplitz equations which can be solved efficiently using Zohar's algorithm as found in "The Solution of a Toeplitz Set of Linear Equations," Journal of the Association for Computing Machinery, Vol. 21, No. 2, pp. 272–276, April 1974.

The coefficients for the DFE feedback filter are given by $$b(n) = \underset{m=0}{\overset{M}{\text{SUM}}} [c(m)w(M + n - m)] \text{ for } n = 1, 2, \ldots, M \quad (8)$$

where $$w(m) = \underset{k=0}{\overset{JM}{\text{SUM}}} [h(k)f(Jm - k)] \text{ for } m = 0, 1, \ldots, 2M \quad (9)$$

The operations in the second processing pass are shown in FIG. 6. The received data samples are passed through a matched filter and a linear canceller. The tap weights for the linear canceller 16 are given by the expression for w(m) in equation (9) above.

The algorithm and functional data flow for the modem subsystem 1 operating in the JR mode is shown in FIG. 7. In this mode of operation the input data rate is very low and there are a small number of data bits per packet. These data bits are encoded into a group of orthogonal codewords by orthogonal encoder 17 and the code words are used to phase modulate a PN sequence by means of PSK baud encoder 18 and modulator 19. The data from a data device is as in the HDR mode scrambeled in scrambeler 11, error correcting encoded in encoder 12 and subjected to an interleaving algorithm in interleaver 13. The modulated PN sequence is filtered in transmit shaping filter 20 and then transmitted. The functional flow and algorithm for the receiver functions in the JR mode of operation is shown in FIG. 8. A narrowband jammer excision filter 21 of the type described by J. W. Ketchum and J. G. Proakis "Adaptive Algorithms for Estimating and Suppressing Narrow-Band Inteference in PN Spread Spectrum Systems", IEEE Transactions on Communications, Vol., COM-30, No 5, pp. 913–924, May 1982 is used to widen the signal and compensate for the effects of tone jammers. Excision filter 21 is an M+1 tap filter with coefficients, a(m); m = 0, 1, ..., M The coefficients, a(m), are obtained by solving a set of M linear equations given by $$\underset{m=1}{\overset{M}{\text{SUM}}} [a(m) * rho(k - m)] = rho(k); k = 1, 2, \ldots, M \quad (10)$$

where $$rho(k) = \quad (11)$$

$$\underset{n=0}{\overset{NSAMP/j - j*M}{\text{SUM}}} [s(j*n)*s(j*(n + k))]; k = 0, 1, \ldots, M$$

-continued $$a(0) = -1.0$$

$j$ = ratio of sample rate to PN chip rate

NSAMP = number of samples in a received packet

The equations are solved for a(1) to a(M). The received signal is then filtered to give $$s(k) = -\underset{m=0}{\overset{M}{\text{SUM}}} [a(m) * s(k - m)] \quad (12)$$

Following excision filter 21 a non-coherent detection scheme is used to select the othogonal code word which produces the largest correlation response energy. The output of filter 21 is passed through a Hilbert transform filter 22 to generate a complex signal. This signal is correlated with PN reference sequence in correlator 23. Correlator 23 is followed by an orthogonal transform 24 which is equivalent to passing the signal through filters matched to each of the possible orthogonal code words. The outputs of the matched filters 25 are passed through squares 26 and adders 27. The code word for the largest output is chosen as the received data by code word decision circuit 28.

The hardware of modem subsystem 1 shown in greater detail in FIG. 9 and is designed to handle the computational load and the system interfaces by means of specialized blocks. The computational loads of modulation and demodulation are handled by three processors. The high speed signal processing calculations are performed by two processors 29 and 30 operating in parallel whose architecture is based on the processor developed by ITT Defense Communications Division for the Navy's Advanced Narrowband Digital Voice Terminal (ANDVT). The third processor identified as a control processor 31 is a Motorola 68000 which is used for control purposes. Control processor 31 interleaves the data, detects the presence or absence of received signals, interfaces to the other subsystems, and initializes and coordinates the operation of the modem functions just described with reference to FIGS. 3-8. The various blocks of the modem subsystem are tied together by a common 68000 processsor 31 and data bus. Most of the activity on the bus is between the control processor and its memory. The bus also carries data between the various blocks. The bus has priority hardware for resolving conflicts when two or more requests for the bus occur simultaneously. This bus is identified as 32 in FIGS. 1 and 9. Modem subsystem 1 also has a timing generator 33 (FIG. 1). Timing generator 33 outputs are phase locked to the high precision frequency reference input from the controller subsystem 4. Absolute time information is given to the modem via a packet timing epoch signal. The timing generator 33 then generates start of packet pulses, PN clocks, analog signal sample clocks, and data port clocks. The I/O (input-/output) circuit 34 (FIG. 1) interfaces to the external control, data, PN ports, and to the input which provides error correction coding. This I/O circuit 34 also buffers the incoming and outgoing data and reads data from or stores data in the processor memory via direct memory access. Various components of circuit 34 of FIG. 1 are shown in FIG. 9 associated with the various processors 29-31. Control processor 31 buffers the data arriving from the data ports and interleaves the data after it has been passed through the error correction coder/decoder 35.

In the received path, control processor 31 deinterleaves the data and buffers the data between the decoding process and the output via coder/decoder 35. Control processor 31 interfaces to controler subsystem 4 and to data ports for mode selection information, frequency hopping control data and data port handshaking signals (request to send, clear to send, and signal detect). Processor 31 also coordinates the two processors 29 and 30 by performing the following functions:

(1) allocating alternate packets of information to be operated on by the processors,
(2) combining information from both processors, and
(3) running doppler and time tracking loops.

Processors 29 and 30 perform the bulk of the calculations for modem subsystem 1. Processor 29 performs the calculations for half of the packets (e.g., all of the even packets) and processor 30 operates on the other packets. Each processor 29 and 30 consists of an ANDVT processor and a DOT processor. The ANDVT/DOT processor is a programmable signal processor designed for speech and modem processing. FIG. 10 contains a general block diagram of the ANDVT/DOT processor. This processor has a Harvard architecture with separate program and data memories 36 and 37, respectively. This two-bus structure enables parallel I/O operations such as loading multiplier 38 from data memory 37 while an input is read by the arithmetic logic unit 39. The processor has a 330 nanosecond cycle time. For high data rate reception each ANDVT processor is augmented by a DOT processor which is optimized to perform complex multiply accummulations as shown in FIG. 10. The DOT processor has a memory 40 which holds complex numbers. Control of the DOT processor, under direction of the ANDVT processor produces sequences of complex multiple accummulates in multipliers 40'. Each multiply/accummulate cycle takes under 170 nanoseconds. Complex products are used in the modulation of the transmitted signal and in the demodulation of the received signal. The individual blocks of the modem subsystem 1 breaks the modem tasks into smaller and more easily handled functions. The combination of all the blocks in the modem subsystem 1 provides the capability to perform the required functions as outlined in FIGS. 3-8 and the flexability to handle new requirements that may arise.

As mentioned above, modem subsystem 1 functions are implemented using three programmable processors. Two processors 29 and 30 process alternate frames of data in the worst case receive mode. The third processor control processor 31 will act as interleave processor to interface the encoder/decoder 35 to the two processors 29 and 30. Each processor 29 and 30 will have a hardware addition to provide the equalizer-cancellor processing requirements as shown at 41 and 42 of FIG. 9. Control and status information I/O transfers will be split between the two processors 29 and 30. Appropriate internal control and status information can then be transferred between the three processors through the bus 32. Analog received Rx data is convereted to Rx symbols by processor 29 alone or alternately by frame, the Rx data is converted by Rx symbols by processors 29 and 30. The Rx symbol data are then transferred to control processor 31 through bus 32. Processor 31 performes the deinterleave algorithm on the received Rx symbol data to produce Rx coded data which is then sent to the frequency hop-system controller subsystem 4. The transmit Tx data is processed through the same hardware except processor 30 is not used to convert Tx symbols to Tx samples.

Tx samples are generated by digital to analog conversion hardware in processor 29 only and are available through a coax connector at the back of the chassis 43.

Rx samples are received by analog to digital conversions hardware in processors 29 and 30 for alternate frame processing. The Rx Samples are available through a coax connector at the back of chassis 43. HW I/O are an extention of each processors 29 and 30 address and data bus. Through this connection, a processor 29 or 30 may transfer data, control, or status information between its hardware equalizer 41 or 42. Hardware equalizers 41 or 42 are functionally considered a part of processors 29 and 30, respectively. Equalizers-cancellers 41 and 42 contain I/O currents that enables an ANDVT processor to transfer data or control information between its hardware equalizer and other ANDVT, the interleave processor or the controller subsystem 4.

Control and status information between the controller susystem 4 and modem subsystem 1 is transferred via equalizer-canceller 41 and 42 which are controlled by processors 29 and 30. The control and status information can then be transferred between processors 29 and 30 or processor 31. Bus 43 enables transfer of control and status information between processors 29 and 30, processor 31 and controller subsystem 4. This bus also enables Tx/Rx coded data to be transferred between processor 31 and coder/decoder 35 and also enables Tx/Rx to be transferred between coder/decoder 35 and controler subsystem 4.

Processors 29 and 30 are programmable signal processors designed for speech and modem processing. It is augmented with a high-speed multiplier and general purpose programmability to satisfy the diverse requirements of digital signal processing computations. The entire design uses the minimum hardware possible and implements functions in software wherever it is consistent with performance requirements to maintain minimum power and size of the machine.

It should be noted that the high speed multiplier 38 (FIG. 10) is placed between the input and output buses to allow loading from either the data memory 37 or the arithmetic logic unit 39. This location is preferred to having multiplier 38 only after the data memory, because if the arithmetic logic unit 39 is the operand source the data must be first stored in memory. The reverse problem would exist if multiplier 38 was directly after the arithmetic logic unit 39. Program Memory 36 is a single-level microprogrammed implementation. All instructions are a single world in length. This allows branch addresses and literals to be immediately available without another memory cycle. The modest program lengths and the modem algorithms allow them to be programmed in one-chip depth of control memory (in a ROM version). This allows the single-level microprogramming.

FIG. 11 is a block diagram of the equalizer-cancellers 41 and 42 of FIG. 9. The I/O logic 45–47 includes straight forward implementation of buffers and registers to transfer data and control information between processors 29 and 30, control processor 31, equalizer cancellers 41 and 42 and controller subsystem 4. Equalizer-cancellers 41 and 42 are implemented with a pipeline architecture consisting of a 16×16 hardware multiplier 48, a 24×24 add/subtract logic 49 and a RAM I/O buffer and accummulator 50 controlled by a macro-micro sequencer 51. A single cycle is accomplished in 200 nanoseconds.

FIG. 12 shows a block diagram of control processor 31. Control processor 31 includes an 8 MHZ 68000 microprocessor 52, a program EPROM 53, a dynamic RAM data storage 54 parallel interface adapters 55 for interprocessor I/O dual RS 232 I/O 56 for development and diagnostic purposes and a serial I/O 57 for coded data transferred to and from coder/decoder 35.

The Modem subsystem 1 requirements call for a frequency hop modem to be used on a high frequency channel which may have severe multipath dispersions. In addition to frequency hopping, there is a requirement for a JR mode in which direct sequence spreading is used as well. A PN sequence modulation is required for spreading. PN sequences are also used for doppler and synchronization acquisition, equalizer training and addressing. Some of the latter functions are needed in the HDR mode (without spreading) as well.

A PN sequence correlates with itself but not with delayed versions of it when the delay is greater than a symbol interval. A long (24 hour) sequence has the greatest security but its correlation function fluctuates when the averaging interval consists of a small number of symbols. There are short (1 to 2 thousand symbols) PN sequences such as maximal length sequences, Gold sequences, etc. which can be generated by linear registers which have good correlation functions when the averaging interval is equal to one period of the sequences. A long PN sequence can be derived from a composite of a number of these shorter sequences. The composite sequence would have good correlation properties for averaging intervals equal to the length of the shorter composite sequences.

In modem subsystem 1, the averaging intervals are 32 symbols or longer, so that either approach for sequence generation is appropriate. The statistical fluctuations in the correlation function are relatively small with this large an averaging interval. The structure of modem subsystem 1 will permit generation of PN sequences from secure key generators, if desired. This does not preclude the use of linear shift registers sequences but simply does not make the architecture dependent on the properties of such specific sequences. Thus, except for the statistical fluctuations due to the finite averaging interval, the PN sequence used for spreading, synchronization, and training, is assumed to have the correlation properties of the long random sequence mentioned above.

The frequency hopping requirement for the high frequency channel with multipath dispersion is a severe constraint on the design of the modem subsystem. The high frequency channel can be modeled as consisting of a small number of discrete propagation paths. The differential propagation delay between separate paths can be several milliseconds and this difference is referred to as multipath dispersion. In other words, if a narrow pulse, e.g., a symbol, is transmitted over the channel, multiple, delayed versions of it will be received. Furthermore, if a PN sequence is transmitted, multiple, delayed versions (echoes) of the sequence are received. The difference in delay between the received sequences can be many symbol periods in duration.

The PN sequences can be used to measure the impulse response of the channel. If the PN sequence is transmitted and the received signal is correlated with a delayed version of the same PN sequence, the result is proportional to the channel impulse response corresponding to that delay time. By repeating the correlation with different values of delay, the channel impulse response can be measured. This impulse response characterizes the multipath dispersion of the channel. The use of a PN sequence minimizes the effect of noise and interference one the channel measurement.

The requirements of the modem subsystem 1 specifies a transmit bandwidth of 3 or 6 kHz, depending on the mode of operation. This is specified as a 99% power bandwidth. This requires that the transmit symbols be shaped by a transmit filter whose impulse response is significant for a number of symbol periods. This is further aggravated by the SSB filters in the RF subsystem 2. The overall impulse response seen at the receiver is a combination of the transmit filter, filters in the Rf subsystem 2 and the multipath dispersion. It is this overall impulse response that is measured by correlating with PN sequences.

Since this overall time dispersion extends for many symbol intervals, some means must be provided at the receiver to compensate for it. Equalization is one means for providing this compensation. Other approaches may also be used. All of these compensation methods require some form of channel measurement, e.g., equalizer training can be interpreted as channel measurement.

The severe problem posed by frequency hopping is due to the fact that the multipath dispersion is changing constantly with time and also is different from one frequency to another. The amplitude and phase of the signal received on an individual propagation path changes with time depending on the fine structure of the propagation conditions. This is known as fading (or multipath fading) an the rate at which it changes is called the fading rate. Individual echoes fade independently of each other. Wideband (greater than 10 kHz) channel measurement experiments (using, for example, PN sequence with symbol rates greater than 10 kHz) have been able to resolve individual echoes. In these experiments, it is found that the amplitude and phase of individual echoes are fairly constant (very low fading rate). However, with the bandwith constraints imposed on modem subsystem 1, the measured overall impulse response is not able to resolve individual propagation paths. When this happens, it is found that the individual echoes change much more rapidly with time (the fading rate is in the range of 1 to 10 Hz). This is due to the fact that now an echo is the resultant of adding several propagation paths, each with different amplitudes and phases. The resultant now changes very significantly due to small changes in phase of the individual components. This is the more commonly measured multipath fading seen with narrowband high frequency systems.

This is also the reason why the channel impulse response changes so significantly from one frequency to the next. The phase of the signal received over an individual propagation path is a sensitive function of the carrier frequency. If the carrier frequency changes (hops) the phases of the individual components all change randomly and the resultant echo amplitude and phase will be completely different from their values before the hop. Based on the requirements for the number of hop frequencies and for fading rate, it can be seen that it is not feasible to try to remember the channel impulse response for each particular frequency because, on the average, it will have changed more or less completely by the next time a particular frequency is reused.

The conclusion is that channel measurement (e.g., equalizer training) must be done independently on each frequency hop. This, combined with the fact that the receiver must compensate for mutipath dispersion that extends over many symbol intervals, puts stringent requirements on the modem subsystem 1 design approach. These considerations also result in requirements for processing capability in the modem subsystem implementation.

The processing capability needed for modem subsystem 1 implementation is determined primarily by the wider bandwidth (6 kHz) modes because the symbol rate and the number of symbols of multipath dispersions are both twice as great as the narrow bandwidth modes. In addition, the processing capability needs to be somewhat greater for the HDR mode because the information rate is higher requiring decisions on each symbol. Thus, the discussion that follows applies primarily to the HDR, 6 kHz, frequency hopping mode.

As discussed above, the requirements for frequency hopping on the high frequency channel with severe multipath distortion present stringent constraints on the design approach. Previous approaches to this problem have used DFE to compensate for the multipath dispersion of the high frequency channel. However, most, if not all, of these have been with frequency hopping. In addition, they have used a relatively small number of equalizer taps in comparison with the magnitude of the overall time dispersion imposed by the present requirements. For example, with the 5100 Hz symbol rate, the time dispersion is 25 symbols in duration which requires an equalizer with 25 feedback taps. Finally, the equalizer training techniques have been complex to implement.

The success of the narrow band high frequency terminal of the application depends upon a sound design approach for the modem subsystem 1 based on clear and well understood theory and implemented in a straightforward manner in which adequate processing capability is provided to insure that the approach determined by the theory is not compromised set forth herein.

As mentioned above, a high frequency modem has been developed for the Advanced Narrowband Digital Voice Terminal (ANDVT) which is implemented in software on a bit-slice signal processor. This hardware is similar to that used in the previous modem with decision feedback equalization mentioned above. Although the ANDVT high frequency model is a multitone modem and does not use equalization, the problems association with acquisition and tracking are similar to the present requirements. It has been found that a software implementation is essential for these sophisticated functions. On the other hand, even though the ANDVT processor has the capability to perform the decision feedback equalization with the number of taps used on previous high frequency modems, it does not have sufficient processing capability to meet the equalization requirements needed for the instant terminal. Therefore, it is proposed herein to augment the ANDVT processors with special purpose equalizer hardware 41 and 42 to perform the processing intensive equalizer functions.

The use of the existing ANDVT processor augmented with special-purpose hardware allows sophisticated real-time signal processing with substantial margin and also permits use of existing software routines and software developed support tools as applicable.

A recent series of papers Gersho, A. and Lim, T. L., "Adaptive Cancellation of Intersymbol Interference for Data Transmission," Bell System Technical Journal, Vol. 60, pp. 1997–2021, November 1981; Mueller, M. S. and Salz, J., "A Unified Theory of Data-Aided Equalization" Bell System Technical Journal Vol. 60, pp. 2023–2038, November 1981 and Foschini, G. J., and Salz, J., "Digital Communications Over Fading Radio Channels," Bell System Technical Journal, Volume 62, pp. 429–456, February 1983, clarifies the theory of optimum detection of data in the presence of noise and channel distortion. It further shows the relation of decision-feedback equalization to the optimal theory. One consequence of this theory for the present application is that the parameters for optimum processor to cancel channel distortion are easily obtained by channel measurement. Also, the theory of the optimum processor is easy to understand and to relate the processing requirements with the multipath dispersion. The pertinent aspects of this theory are summarized here.

The theory applies to the channel model discussed above. Symbols, which may be complex to represent multiphase data symbols, are transmitted through a transmit waveform shaping filter and then through the channel with multipath dispersion. The resultant signal along with additive, white noise is received at the modem input.

The optimum receiver consists of a linear filter matched to the overall impulse response (of the transmit filter and channel combined) followed by a linear canceller which removes intersymbol interference (ISI).

This has a satisfying interpretation. The matched filter maximizes the signal-to-noise ratio of the symbol to be detected. It effectively maximum ratio combines all of the individually-received echoes of that symbol which turns the multipath dispersion to a diversity-combining advantage. This is directly opposite to a linear equalizer which attempts to flatten the frequency response in effect enhancing the noise at places where the signal is weak.

The matched filter improves the signal-to-noise ratio of the desired symbol, but increases the ISI caused by adjacent symbols. However, the matched filter in the optimum receiver is followed by a linear canceller which subtracts out all ISI. Tnus, the optimum receiver has the performance of a system which sends only one symbol in which ISI is not a factor.

FIG. 13 shows the overall impulse response of the transmit filter and cnannel, h(t). For simplicity, it is shown as just a rectangular pulse with total time dispersion of MT seconds, where T is the symbol interval. The matched filter has impulse response $h^*(-t)$, where the asterisk denotes complex conjugate. FIG. 14 shows the overall impulse response of the transmit filter, channel and matched filter, r(t), which is just the convolution of h(t) with $h^*(-t)$. This has a total duration of 2MT seconds The output of the matched filter is sampled at the symbol rate in the optimum receiver. FIG. 14 illustrates the corresponding samples of r(t).

FIG. 15 illustrates the output of the matched filter when the transmit filter is driven by a symbol sequence $a_n$. Consider a sample of this output at time nT. The desired symbol appears at this time with amplitude $a_n r_o$. In addition, the sample will contain ISI terms due to symbols which precede and follow on There are a total of 2M ISI terms, M of which, $a_{n-M} r_M, \ldots, a_{n-1} r_1$, are postcursors due to symbols which precede $a_n$ and M of which, $a_{n+1} r_{-1}, \ldots, a_{n+M} r_{-M}$, are precursors due to symbols which follow $a_n$. The linear canceller generates these ISI terms and subtracts them from the matched filter output sample prior to the symbol decision. Thus, the symbol decision is made on the desired symbol plus noise without ISI.

The optimum receiver is not realizable directly because it requires knowledge of the M symbols before and after the desired symbol to cancel the ISI. In practical receivers, prior decisions are used for these symbols. In this case, the only difference between the optimum and the practical receiver is due to the decision errors in these symbols. Practical approaches to linear ISI cancellation are discussed below.

The theory also determines a sub-optimum receiver which applies if the linear canceller has less then the 2M taps needed to cancel all of the ISI. This modification consists of a linear-transversal filter following the matched filter and preceding the linear canceller (which has a reduced number of taps). The tap spacing for the transversal filter is the symbol interval T.

The transveral filter has taps corresponding to the ones which have been deleted from the canceller. In this case, the tap gains for the transversal filter are determined to minimize the mean-square error between the transversal-filter output (less the ISI removed by the remaining canceller taps) and the desired symbol amplitude assuming the noise is present.

Figure 16:
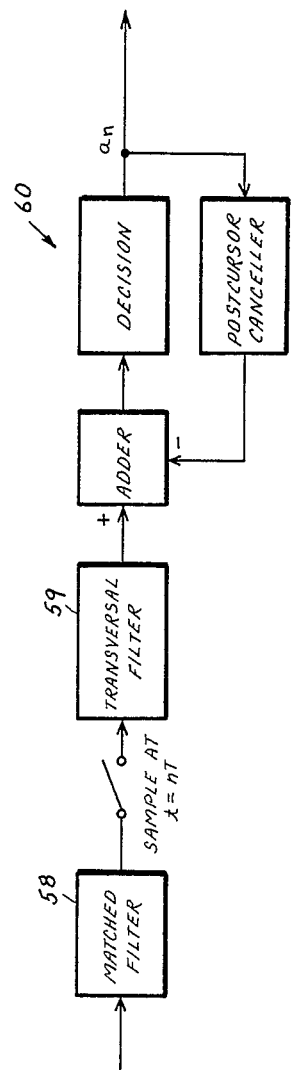
FIG. 16 is a block diagram illustrating the algorithm of the decision feedback equalizer of FIG. 9.

The sub-optimum receiver which results if the M precursor taps (corresponding to symbols following the desired symbol) are deleted from the linear canceller is equivalent to a decision feedback equalizer. This decision feedback equalizer is illustrated in block form in FIG. 16. FIG. 16 shows the matched filter 58 whose output is sampled at the symbol rate and the transversal filter 59 (of the sub-optimum receiver) which minimizes precursor ISI and noise. The feedback filter 60 is also a transversal filter with M taps to cancel the ISI from the M symbols following the desired symbol. It uses the prior symbols decisions to generate the postcursor ISI terms.

Figure 17:
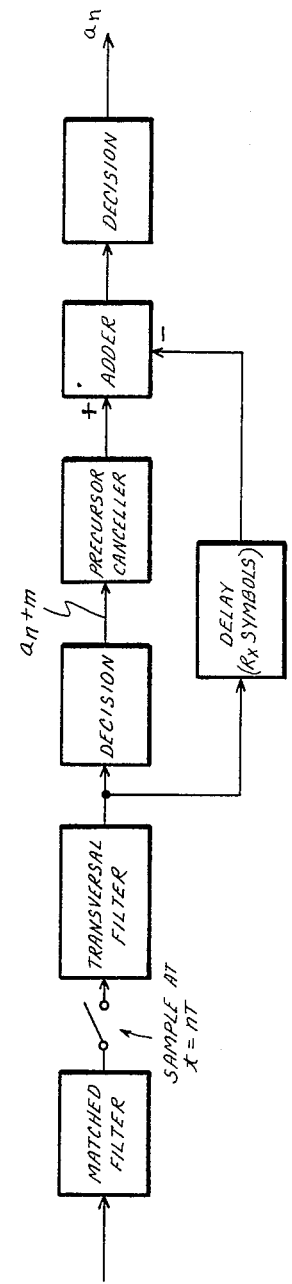
FIG. 17 is a block diagram illustrating the algorithm of the decision feedforward equalizer that could be substituted for the feedback equalizer of FIG. 16.

It is also possible to make a sub-optimum receiver in which the M postcursor taps are deleted from the linear canceller. This is illustrated in the decision feedforward equalizer of FIG. 17.

The equalizer-canceller in modem subsystem 1 and identified as 41 and 42 in FIG. 9 is shown in block diagram form in FIG. 6. It is intended that the equalizer-canceller process the received data in several passes. Therefore, the input data and output data is stored in buffer memory, such as buffers 61 and 62, so that it can be reused on each pass.

The first pass corresponds to the conventional decision feedback equalizer. In this case the switch 63 is in the down position so that the input data passes through transversal filter 64 which minimizes precursor ISI and noise (the parameter weights for this filter are not shown in FIG. 6). The feedback transversal filter 65 cancels the postcursors ISI using prior symbol decisions obtained in decision circuit 66. The resulting symbol decisions are stored in buffer 62 for the next pass.

At this point the process could stop. However, since now a complete set of symbol decisions exists in memory, the input dat can be passed through the equalizer-canceller. This time switch 63 is in the up position so that the system operates as a linear canceller, canceling both precursor and postcursor ISI. The weighting coefficients are the samples of the overall impulse response of the transmit filter, channel and matched filter, discussed previously and shown in FIG. 14. The coefficients for the canceller must be changed after the first pass to the values shown. The symbols and the coefficients will be complex in the proposed system. The second pass can be expected to produce fewer decision errors than the first pass because the prior decisions are used to cancel precursor ISI as well as postcursor ISI. In simulation experiments of a similar system the linear canceller produced as much improvement in performance over the decision feedback equalizer as the decision-feedback equalizer does over a linear (transversal) equalizer. Further passes can be expected to refine the decisions still further. The system of the application will be capable of at least three passes in realtime. Additional passes beyond three which are possible with the proposed hardware, will result in only marginal improvement.

A frequency hopping modem for the high frequency channel must perform equalizer training on each frequency hop as discussed previously. For the equalizer-canceller discussed hereinabove, this consists of channel measurement to determine the overall impulse response of the transmit filter and channel. From this information, the parameters of the matched filter, DFE and linear canceller must be calculated.

As discussed previously, the channel measurement is achieved by correlating the receive PN training signal with delayed versions of the PN sequence. This result is a sampled version of the impulse respnse h(t). The sampling interval for this impulse response and the matched filter is T/3, where T is the symbol interval.

The implementation of the matched filter will now be discussed. As already discussed, the output of the matched filter is sampled at the symbol interval T. These output samples are complex.

Although the matched filter output is sampled at the symbol interval T, the matched filtering operation itself must be done at a higher sampling rate which is consistent with the signal (and filter) bandwidth.

Figure 18:
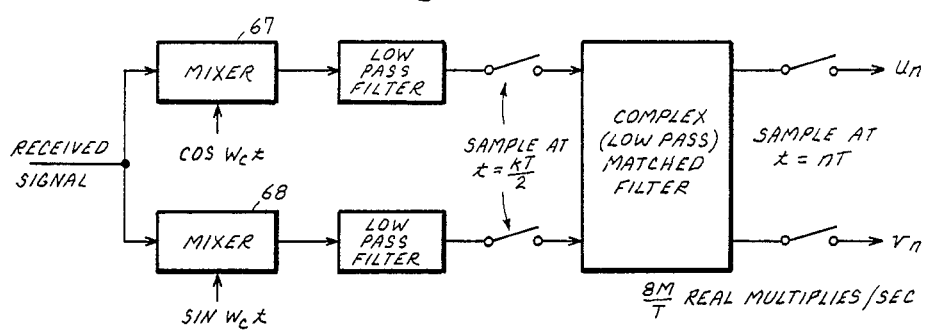
FIG. 18 is a block diagram illustratng the quadrature demodulation approach for a bandpass matched filter.
Figure 19:
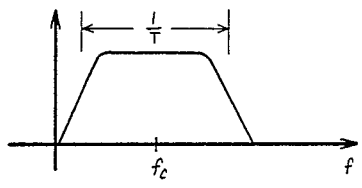
FIG. 19 is a waveform illustrating the received signal bandpass spectrum.
Figure 20:
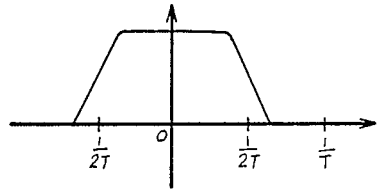
FIG. 20 is a waveform illustrating the received signal low pass spectrum.

Systems described in the literature frequently take the form shown in FIGS. 18-22. FIG. 19 shows the bandpass spectrum of the received signal with the carrier frequency, fc, and Nyquist interval, 1/T, indicated. In this approach, quadrature mixers such as shown in FIG. 18 by mixers 67 and 68 are used to demodulate the carier signal to the low pass spectrum shown. In the low pass spectrum, the Nyquist interval is ½T. Since practical systems use excess bandwidth (beyond the Nyquist interval), sampling must occur at a rate greater than 1/T. A sampling interval of T/2 is thus convenient. Complex samples are taken, as shown, in FIG. 18, where the real part of the sample is assumed to be the sample of the in-phase compoent and the imaginary part to be the quadrature sample.

The T/2 sample signal is passed through the low pass equivalent matched filter 69. The input and output samples of this filter are complex quantities. An output sample must be computed once every T seconds. Assuming the overall impulse response of the transmit filter and channel is MT seconds in duration, each output sample is the sum of 2M weighted input samples so that 2M/T complex or 8M/T real multiples per seocond are required for the matched filter.

A slightly different approach is used in the present arrangement. This approach samples the bandpass signal directly at the output of bandpass matched filter 70. Inspection of the bandpass receive spectrum shows that these samples must be at a rate greater than 2/T to accomodate the excess bandwidth (greater than the Nyquist interval). T/3 is a convenient sample interval, and as will be shown, leads to less processing than T/2 lowpass sampling.

Figure 21:
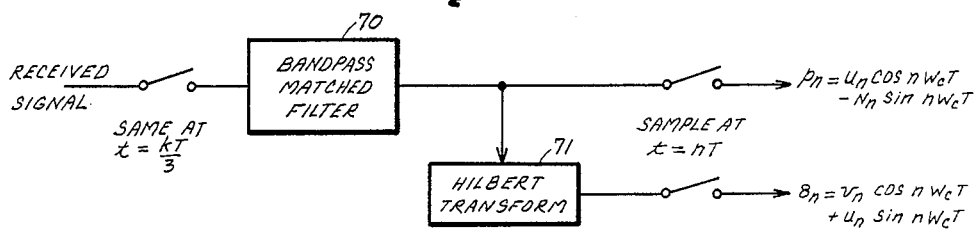
FIG. 21 is a block diagram illuatrating the algorithm for a bandpass filtering approach for a matched filter.

FIG. 21 shows this T/3 approach. The matched filter is a bandpass filter 70 which is matched to the overall impulse response of the transmit filter and channel. The output of matched filter 70 is sampled once every T seconds to give the real sample of the output. In addition, the matched filter output of filter 70 is passed through a Hilbert transform 71 to generate the imaginary sample. This complex output sample is identical to the corresponding output sample in the lowpass approach of FIG. 18 except that it has been rotated by the carrier phase angle. This corresponds to the fact that these samples will represent the bandpass signal before demodulation. Retaining the carrier phase at this point is useful for doppler tracking.

Figure 22:
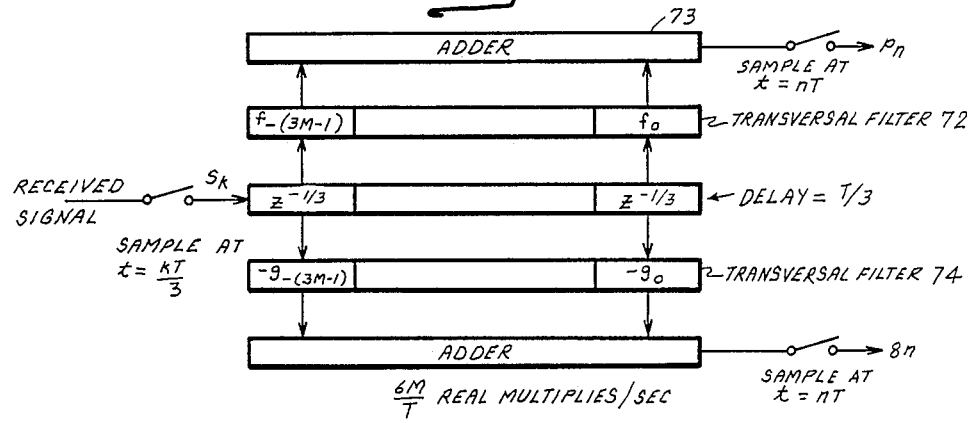
FIG. 22 is a block diagram illustrating a matched filter implementation.

FIG. 22 shows a slightly different approach to the bandpass matched filter arrangement of FIG. 21. Here, the upper transversal filter 72 represents the bandpass filter matched to the overall impulse response of the transmit filter and channel. Its output generates the real output samples at the output of adder 73. The lower transversal filter 74 is identical except that its coefficients have been transformed by a Hilbert transform. Its output therefore generates the imaginary output samples. For each (complex) output samples, 6M real multiples are required giving a total of 6M/T real multiplies per second. Thus, based on the number of multiples, this approach uses 25% less processing than the corresponding lowpass approach of FIG. 18. Actually, the approach of FIG. 22 has a greater savings because the lowpass filters used in the lowpass approach of FIG. 18 to remove the second harmonic components in the demodulator do not need to be implemented.

The terminal of FIG. 1 has stringenet requirements on the transmit symbol waveform shaping filter which is required to maintain the 99% power point bandwidth to 3 or 6 kHz. The transmit filter requirements are related to the symbol rate which should be as close to this allowed bandwidth as possible for maximum spread spectrum processing gain.

As discussed previously, the duration of the transmit filter impulse response adds to that of the channel multipath dispersion in determining the overall dispersion which must be equalized at the receiver. This overall dispersion has a major effect on the amount of processing required at the receiver for matched filtering and equalization.

In the wideband HDR mode, the data input consists of two 2400 bit/second data streams. These will be multiplexed into a single 4800 bit/second data stream before coding. The coder output will be a 9600 bit/second stream rate which then goes into the interleave buffer. The interleave buffer transmits the data as a block consisting of a number of frequency hops (packets). Even with zero interleave depth, the coder output data is still transmitted in the form of packets in which the receiver maintains synchronization over each packet. Therefore, it is possible for the receiver to be able to identify individual bits in a block of data, either interleave blocks or packets.

This permits multiplexing of the two 2400 bits/second data streams without additional overhead beyond that already used for packet synchronization. Packet synchronization and knowledge of packet number supplied by the Rf subsystem 2 permits the receive modem to identify the relation of each receive symbol to the specific bits in the original 2400 bits/second data streams. Of course, this relation is complex because of the coding, interleaving, symbol encoding, frequency hopping, and decoder start-up and delay. However, the receiver knows where the desired receive data starts. Therefore, the demultiplexing of the two 2400 data streams can easily be achieved without special multiplexing overhead.

Figure 23:
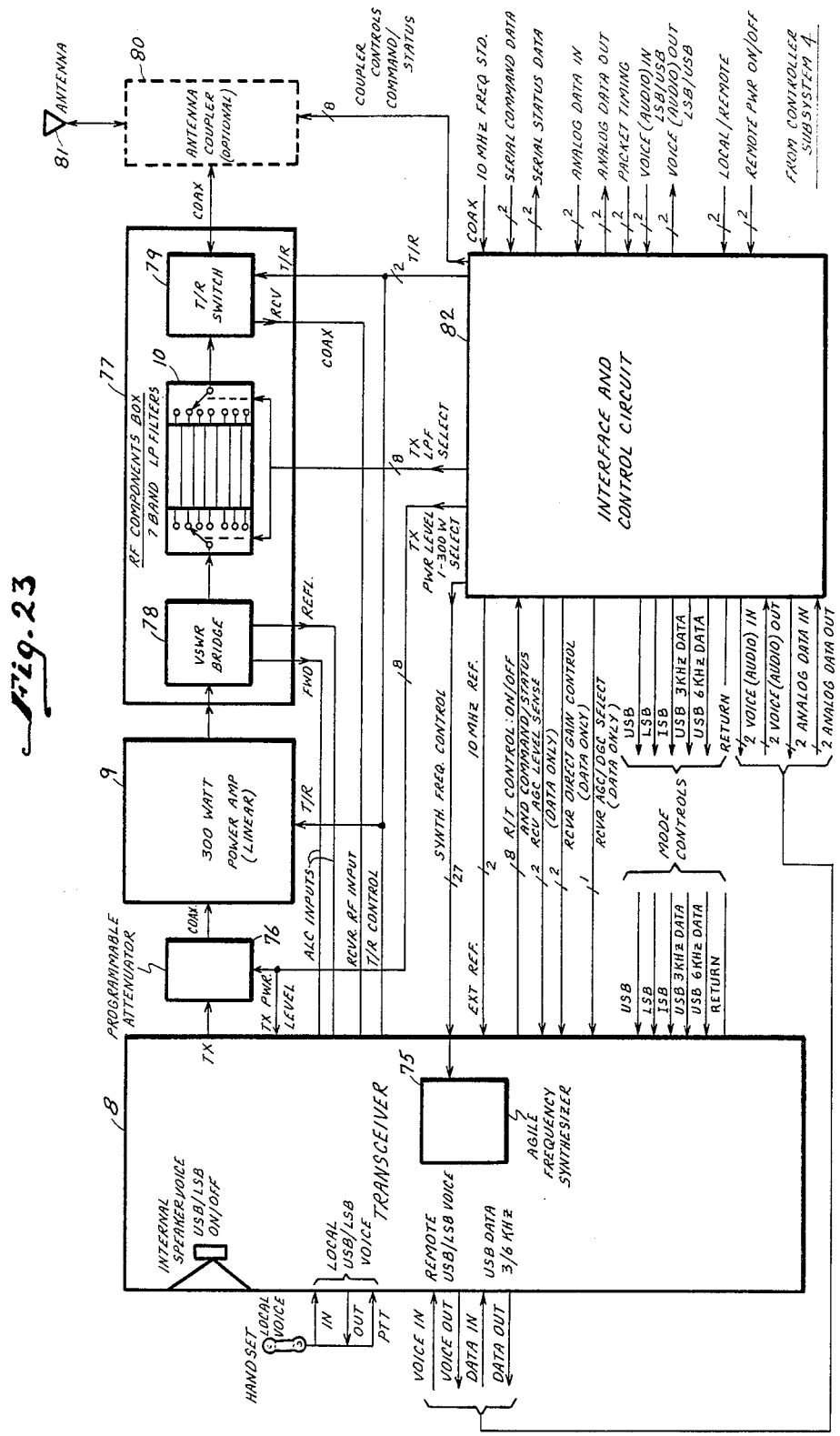
FIG. 23 is a more detailed block diagram of the RF subsystem of the terminal of FIG. 1.

FIG. 23 is an enlarged block diagram of the Rf subsystem 2 which includes a transceiver 8 having therein an agile frequency synthesizer 75, programmable attenuator 76 associated with the power amplifier 9 and a Rf component box 77 included therein a voltage standing wave ratio bridge 78, agile low pass filter and power detector 10 and a T/R (transmit/receive) switch 79. Switch 79 is coupled to an optional antenna coupler 80 which is coupled to antenna 81. The components just named are under control of the interface and control circuit 82 which in turn is controlled by controller subsystem 4.

Figure 24:
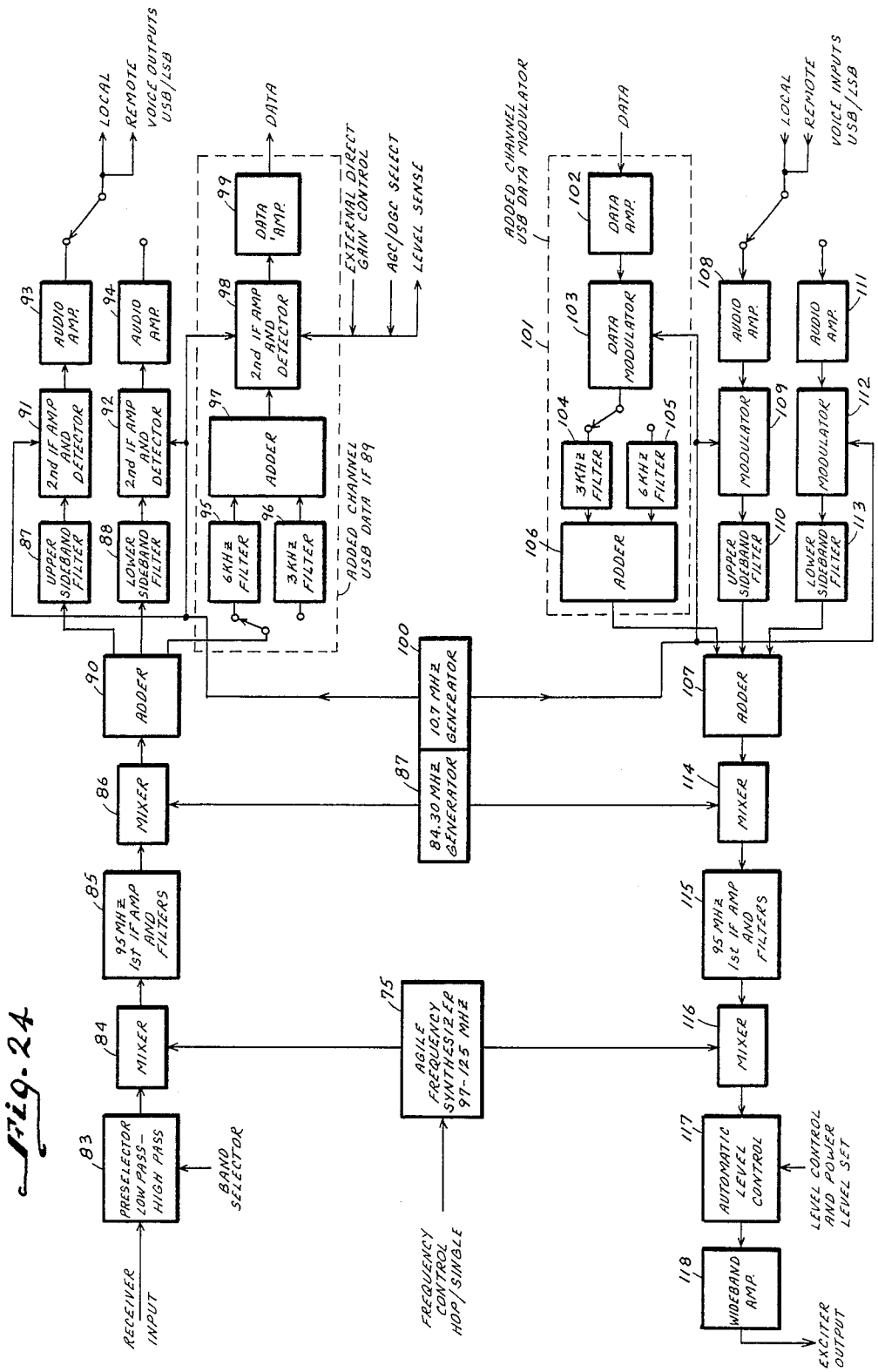
FIG. 24 is a block diagram of the tranceiver of FIGS. 1 and 23.

Referring to FIG. 24 there is illustrated therein a detailed block diagram of transceiver 8. The receiver input is coupled to a preselector 83 which is caused to select the low or high passband. The output of preselector 83 is coupled to mixer 84 receiving its frequency input from frequency synthesizer 75. Frequency synthesizer 75 has applied thereto a frequency control to provide either a single frequency output or a hopped frequency output. The output of mixer 84 is coupled to the first IF amplifier and filter 85 whose output is coupled to mixer 86 receiving a frequency input from a generator 87. The output of mixer is coupled to upper side band filter 87, lower side band filter 88 or the added channel 89 data through adder 90. The output of filters 87 and 88 are coupled to second IF amplifiers and detectors 91 and 92, respectively, and, hence, to audio amplifiers 93 and 94 respectively. Channel 89 selects the 3 kHz or 6 kHz channel and applies the signal applicable thereto through filter 95 or 96 and applies the signals passed by filter 95 or 96 to adder 97, and hence, to second If amplifier and detector 98 whose output is coupled to data amplifier 99. The local oscilator signal for If amplifiers and detectors 91, 92 and 98 is provided by generator 100. The transmitter portion of the transcriber 8 includes the added channel data modulator 101 which includes data amplifier 102, data modulator 103 and the channel filters 104 and 105 whose outputs are coupled to adder 106. The output of adder 106 is coupled to adder 107. Other inputs to adder 107 are provided by audio amplier 108, modulator 109 and upper side band filter 110 and also audio amplifier 111, modulator 112 and lower side band filter 113. The adders 90, 97, 106 and 107, pass funcion like or gates and pass the appropriate signal to the appropriate channel, or in the case of adders 106 and 107 the signal of the active channel to the output of the adder 106 and 107.

The output of adder 107 is coupled to a mixer 114 which receives its local oscillator input from generator 87. The output of mixer 114 is passed to the first IF amplifier and filters 115 and, hence, to mixer 116 to raise the transmitter frequency to the desired frequency value and to hop the transmitted frequency when required. The output of mixer 116 is coupled to an automatic level control circuit 117 and, hence to wideband amplifier 118 to provide the exciter output.

Figure 25:
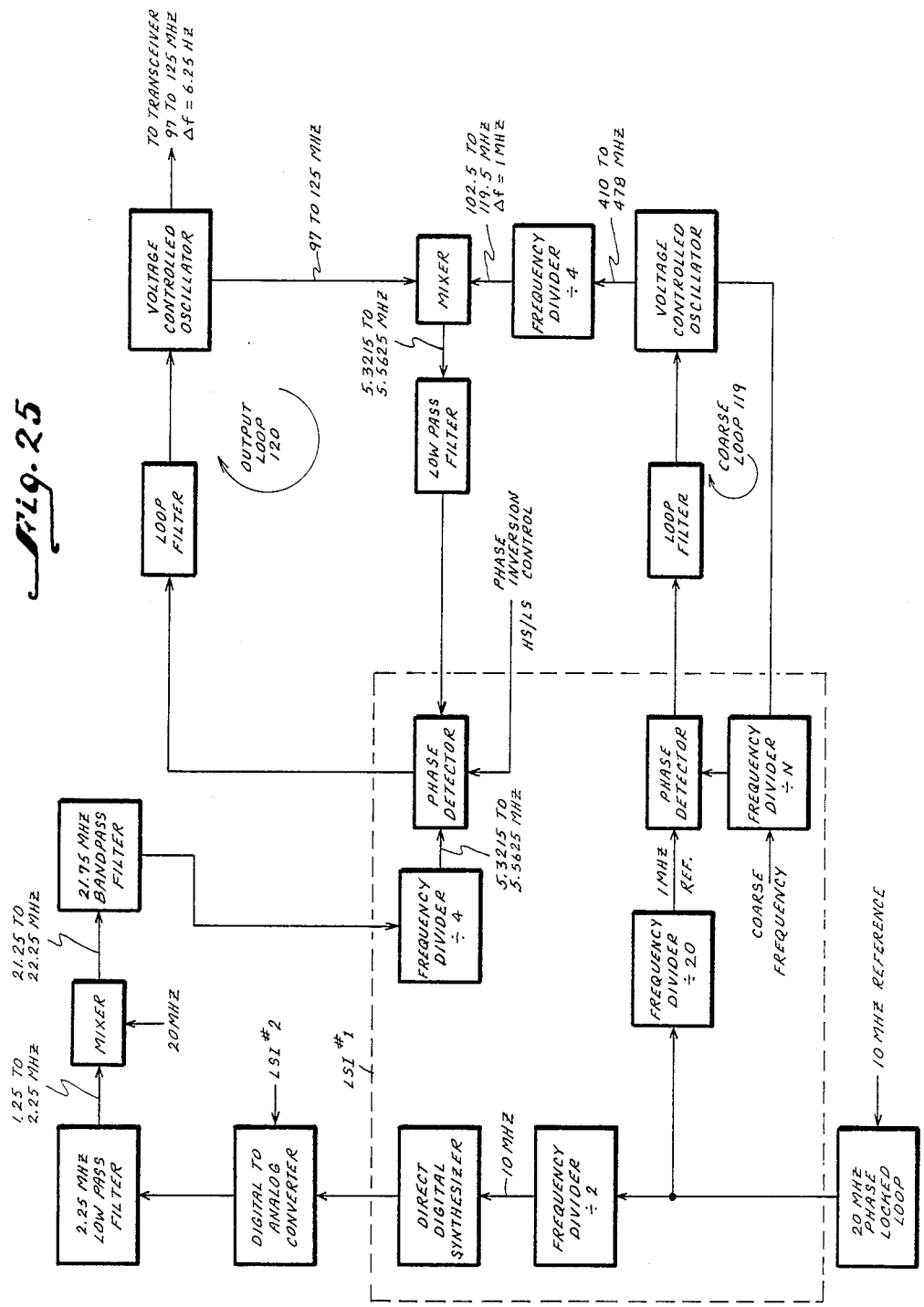
FIG. 25 is a block diagram of the agile frequency synthecizer of FIGS. 1, 23 and 24.

FIG. 25 is a block diagram of agile frequency synthesizer 75 of FIGS. 1 and 24 and includes therein two frequency locked loops as shown therein labeled coarse loop 119 and output loop 120. The components of the frequency synthesizer are shown in FIG. 25 which operate in the usual fashion and, therefore, a detailed description of FIG. 25 is not believed to be necessary.

Figure 26:
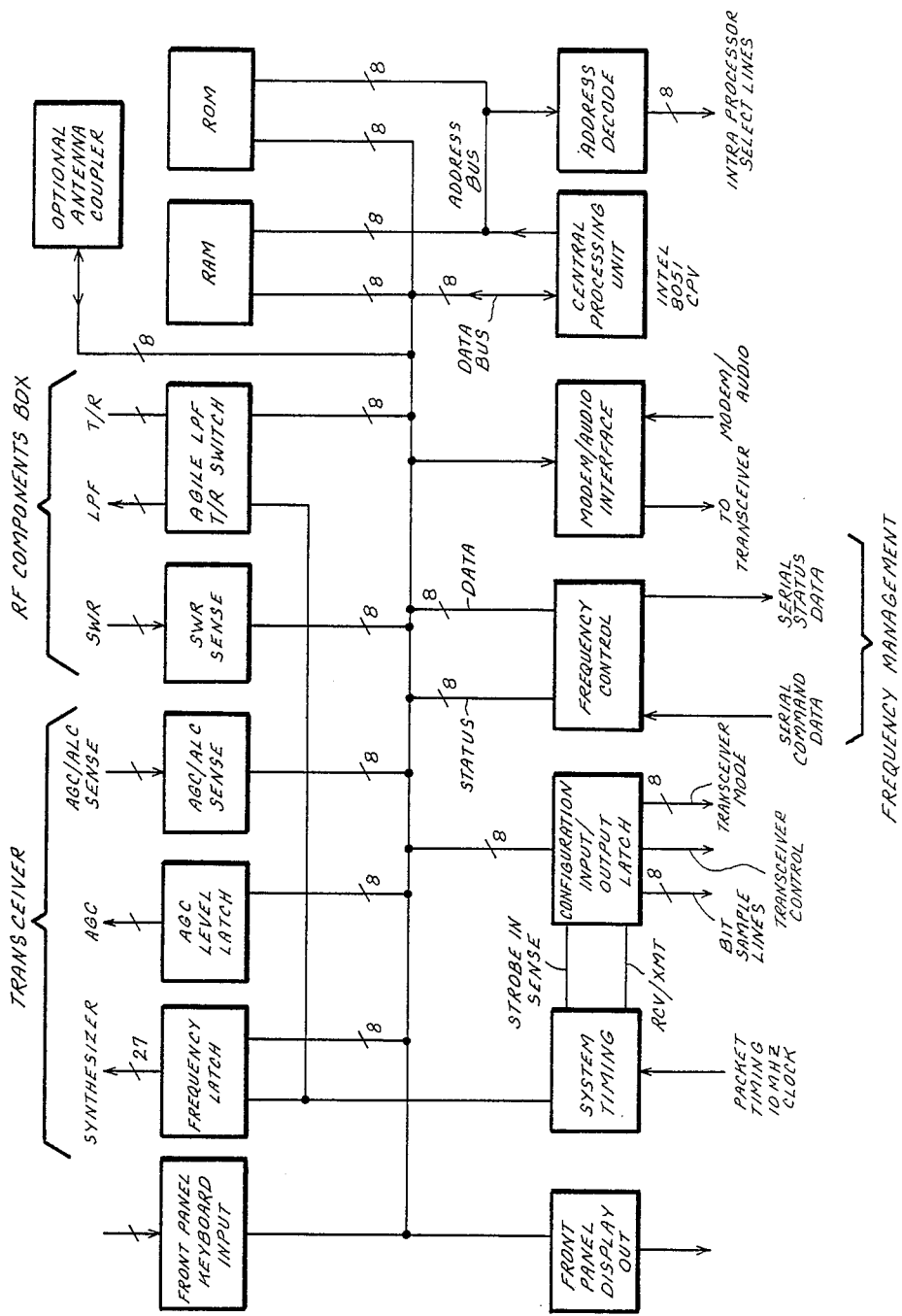
FIG. 26 is a block diagram illustrating the RF interface and control circuit of FIGS. 1 and 23.

FIG. 26 is a detailed block diagram of the interface and control circuit 82 of FIGS. 1 and 23 with the components of this interface and control circuit and the operation thereof believed to be self-explanatory in view of the labeling of the various blocks and leads associated therewith and a detailed description thereof is not believed to be necessary.

Figure 27:
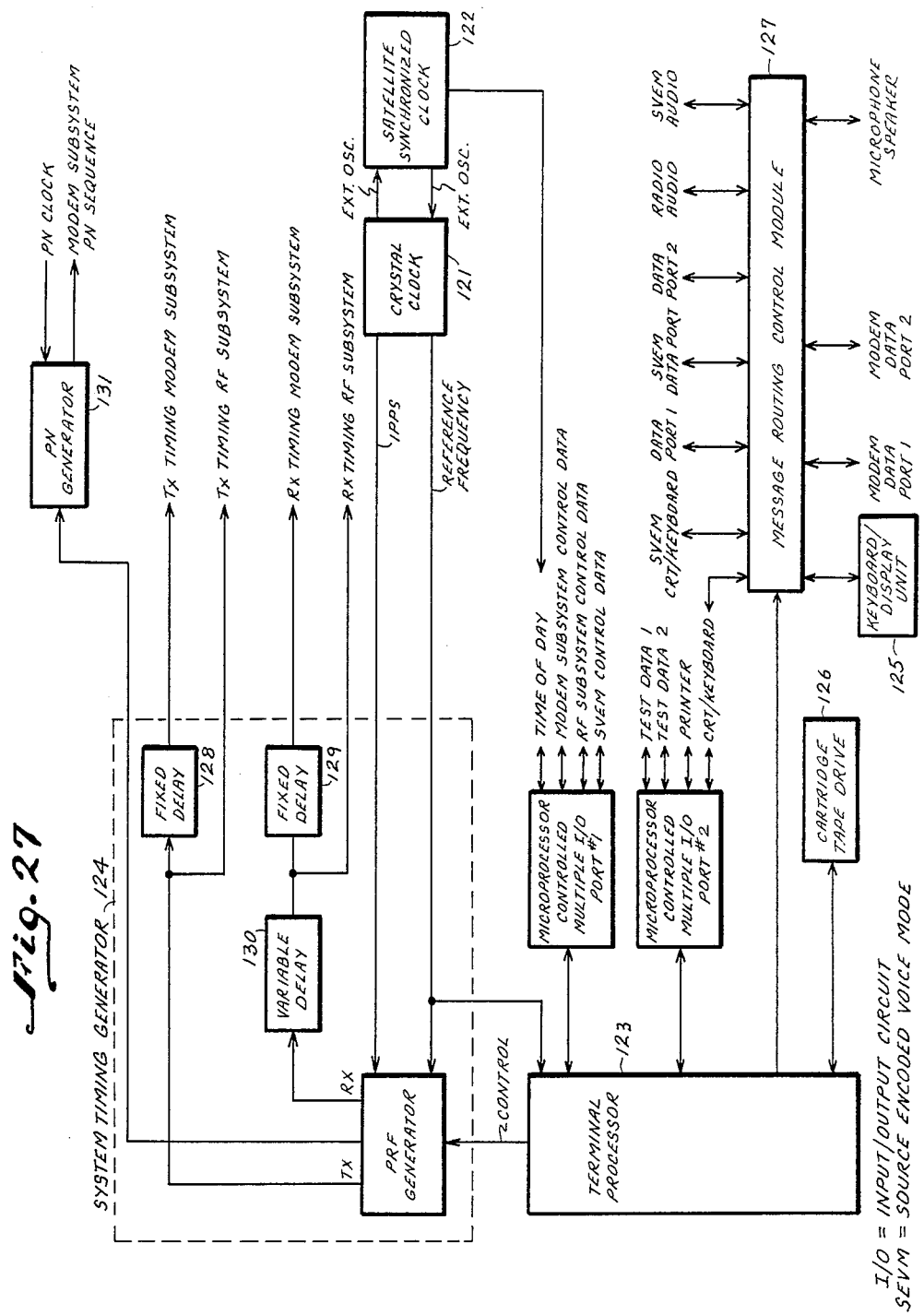
FIG. 27 is a block diagram of the controler subsystem of FIG. 1.

FIG. 27 is a block diagram of controller subsystem 4. Controller subsystem 4 as illustrated in FIG. 27 allows the high frequency communication system to be operated from a central or a remote location for both fixed frequency and frequency-hopping modes of operation. With the exception of the packet timing module, all proposed nardware is available off-the-shelf. It is also almost entirely digital. This approach was adopted to allow maximum flexibility while minimizing design costs.

The crystal clock 121 and satellite synchronized clock 122 for timing syntnronization is currently being used with great reliability as is the frequency hopping mode of operation.

Controller subsystem 4 is an integrated microcomputer system that provides the facilities to operate the narrowband high frequency communication system in all its operational modes. Its primary building blocks are terminal processor 123, system timing generator 124, keyboard-display unit 125, cartridge tape drive 126, the aforementioned crystal clock 121 and satellite synchronization clock 122, message routing control module 127 and a printer (not shown).

After power turn-on terminal processor 123 will exercise a self-test sequence where proper operation of the system will be verified. The user will then be given the option to initialize the system either authomatically through the cartridge tape drive 126, or manually through the keyboard/display 125. The user is prompted for the correct input response. The input parameters are tested for validity with an appropriate error message being displayed when they are incorrect. Upon completion, and at any time thereafter, the user will be able to generate a new or updated cartridge tape for use in automatic initialization.

After initialization, the system reads the satellite synchronized clock 122 and waits for an authorized start time. One second before start time, the new PN sequence is computed for the PN generator. This generator is then flushed and the old PN sequences are replaced by the new Pn sequences. The system then readies itself for operation which commences with the next clock edge.

The operator will be presented a menu display of the system operational modes available and the keyboard input commands required to initiate them. Data inputs for the operational mode are entered through the console keyboard 125. The system prompts the operator via the console display 125 as to what information must be entered in order to properly exercise that mode. The system has a Control and Communication mode available. In the Control mode, the user is able to:
 Select the system hopping frequencies
 Select the Synchronization Preamble
 Select the Interleaving Depth
 Select the output power level Select local or remote operaion of system
Select full or half-duplex operation
Exercise the system Built-In-Test In the Communication mode, the user has the following modes of operation available:
SSB Voice
Low Data Rate - A/J
High Data Rate - no A/J In the SSB Voice mode, the operator is able to enter the frequency and sideband directly from the keyboard (2.0 MHz to 30.0 MHz in 10 Hz increments, USB, LSB or ISB) or choose one of the allowable channels from a table of prestored frequencies. The RF subsystem 2 and in particular transceiver 8 is instructed to tune to that frequency. The remote microphone and speaker are connected to the transceiver and the operator is prompted to begin voice communication.

In the Low Data Rate - A/J mode the operator chooses either the Data or Source Encoded Voice mode of operation.

In the Data mode, the operator selects through interactive keyboard/display unit 25 the following:
Data rate
Packet rate/bandwidth
Mode
  Fixed Frequency
    Channel number
  Frequency Hopping
    Channels to use
    Select Call address to call The system then instructs the transceiver to tune to the channel frequency in the fixed frequency mode or the hopping frequencies according to frequency hopping algorithm. The external Data Port 1 is connected to the Modem's Data Port 2 and the operator is prompted to begin data transmission.

In the Source Encoded Voice Mode (SEVM), the data rate and packet rate/bandwidth are fixed. The operator selects through interactive keyboard/display unit 125 the following:
Fixed frequency
  Channel number
    Frequency Hopping
    Channels to use
    Select call address to call The system then instructes the transceiver to tune to the channel frequency in the fixed frequency mode or the hopping frequency according to the frequency hopping algorithm. The remote microphone and speaker are connected to the SEVM audio input, the Modem's Data Port 1 is connected to the SEVM's data port and the keyboard/display unit 125 is connected to the SEVM keyboard/display port. The Source Encoded Voice Module then prompts the operator on further inputs. This is all accomplished through necessary routing control module 127.

In the High Data Rate - non-A/J mode the operator chooses either the Single Channel or Two Channel Data mode of operation.

In the Single Channel Data mode the packet rate/bandwidth is fixed. The operator selects through interactive keyboard/display unit 125 the following:
Data Rate
Mode
  Fixed Frequency
  Channel number
    Frequency hopping
    Channels to use
    Select call address to call The system then instructs the radio or transceiver 8 to tune to the channel frequency in the fixed frequency mode, or the hopping frequency according to the frequency hopping algorithm. The external Data Port 1 is connected to the Modem's Data Port 1 and the operator is prompted to begin data transmission. This again is accomplished by module 127.

In the Two Channel Data mode the packet rate/bandwidth and data rate are fixed. The operator selects through the interactive keyboard/display unit 125 the following:
Mode
  Fixed frequency
  Channel to use
    Frequency hopping
    Channels to use
    Select call address to call The system then instructs transceiver 8 to tune to the channel frequency in the fixed frequency mode or the hopping frequencies according to the frequency hopping algorithm. Through module 127 the external Data Port 1 is connected to Modem's Data Port 1 and the external Data Port 2 is connected to the Modem's Data Port 2. The operator is then prompted to begin data transmission.

The Terminal processor 123 is an integrated microcomputer system consisting of an Intel 86/30 single board computer and two 544 Intelligent Communications Controllers. The single board computer is centered around an 8086-2 central processing unit with a clock rate of 8 MHz. It contains 128K bytes of dual port RAM and up to 64K bytes of ROM. The Inteligent Communication Controllers contain an on board dedicated 8085A microprocessor providing communications control and buffer management for four programmable synchronous/asychronous channels.

The System timing generator 124 gives an on-off control of modem subsystem 1 and RF subsystem 2 for modular suppression during interpacket time in the frequency hopping mode. The fixed delays in transmit and receive timing signals provided by fixed delays 128 and 129 are provided to compensate for system filter delays in the transmit path between modem subsystem 1 and the RF subsystem 2 and in the receive path between RF subsystem 2 and modem subsystem 1. A variable delay 130, with a range of 0 to 10 milliseconds in 0.1 millisecond increments, is also provided in the receive timing signals path to compensate for any propagation delay between the spaced terminal sites.

The Interactive keyboard/display unit 125 (DEC VT-100) is the primary operator/system interface. It provides the user central control of all system modes and functions, and central viewing of all system indicators and error messages. All system modes are initiated by entering the appropriate commands through keyboard/display unit 125.

Cartridge tape drive 126 (Cipher F420-30) provides the system with a mass storage devices for data input in automatic system initialization. It also enables the user to generate a new or updated initialization cartridge tape at any time during system operation.

Crystal clock 121 and satellite synchronized-clocks 122 combined provide the system with a stable time source for synchronous operation in the frequency hopping mode.

Crystal clock 121 (Austron 12100) with a frequency stability of $\pm 2 \times 10^{-10}$, is used by the system to generate precise timing signals for modem subsystem 1 and RF subsystem 2. It also acts as a reference frequency for satellite synchronized clock 122 which is used to update time automatically if satellite reception is lost. The portable crystal clock 121 is a self-contained time reference providing a stable time base for synchroniziing system timing and software interrupts. It contains a battery backup to maintain clock stability during power outages or during transport from one geographic location to another.

Satellite sychronized clock 122 (True Time Instruments 468-DC), continually updated by the NOAA "GOES" satellite, automatically provides the system NBS time to an accuracy of ±1.5 milliseconds. Clock 122 contains two satellite synchronized clocks whose components are hand matched to provide 50 microsecond timing correlation between the units when they are locked to the same satellite at the same location. A master synchronizing pulse, generated by satellite synchronized clock 122 synchronizes crystal clock 121 and, therefore, system timing, to within 0.4 microseconds of satelite synchronized clock 122.

Message routing control module 127 provides the automatic signal routing control necessary to operate the system in its various modes. After selection of the mode of communication through the interactive keyboard/display 125, the system sends control signals to message routing control module 127 to connect the system in its proper configuration.

A printer (DEC LA-120) (not shown) provides the user a hard copy of all test results during system automatic test sequences.

The operating software will provide the following:
Initialization
Self Testing
PN Generator
Operatin Control
System Input/Output During initialization the controler subsystem 4 reads the initialization data from the cartridge tape drive 126, read the clock from the satellite synchronized clock 122 and seeds the PN Generator, and starts the hardware cycling.

During the self test the system will test RAM, ROM and central processing unit operation as well as system timing.

The PN Generator is a software shift register of sufficient length (greater than 25 bits) to have a repeat cycle of greater than 24 hours. The output and at least two other bit positions are MOD 2 summed to form the input to the shift register. The taps are chosen so that the characteristic polynomial of the register will produce a maximum length sequence.

The Operational Control is a software module that generates frequencies of the transmitter/receiver from the PN sequence, during frequency hopping operation. It provides the operator with user friendly promptly during mode seletion and parameter input, and provides output parameters to the subsystem modules for real time control during the system operation. It will poll the subsystems to determine status and alert the operator with approprate error messages during malfunctions.

The System Input/Output module packs the subsystem control information and provide it to the intelligent communication controllers of terminal processor 123 for output to the Subsystem Modules. The following Table I indicates I/O Data of controller subsystem 4:

TABLE I

| DEVICE | DESCRIPTION | INPUT | OUTPUT |
|---|---|---|---|
| (1) Modem Control | Data | (1) AGC Indication | (1) EPOC Number |
|  |  | (2) Sync. Indication | (2) Frequency |
|  |  | (3) Status | (3) Interleaving depth |
|  |  | (4) Signal Quality | (4) Preamble sync. sel. |
|  |  |  | (5) Bandwidth |
|  |  |  | (6) Packet rate |
|  |  |  | (7) Data rate |
|  |  |  | (8) AJ/No AJ |
|  |  |  | (9) FH/No FH |
|  |  |  | (10) Callee address |
|  |  |  | (11) Remote/Local |
|  |  |  | (12) Exercise Bit |
| (2) SEVM | Control Data | (1) Status | (1) Remote/Local |
|  |  |  | (2) Exercise Bit |
| (3) Transmitter Receiver | Control Data | (1) Status | (1) Frequency |
|  |  |  | (2) USB, LSB or ISB |
|  |  |  | (3) Output power level |
|  |  |  | (4) AGC-level set |
|  |  |  | (5) Bandwidth |
|  |  |  | (6) Remote/Local |
|  |  |  | (7) BIT |
| (4) Data Set 1 | Test Results | Data | — |
| (5) Data Set 2 | Test Results | Data | — |
| (6) Keyboard Display | User Information | Keyboard Data | Display Data |
| (7) Printer | Test Data | — | Data |
| (8) External Time Source | Time | Data | — |

TABLE I-continued

| DEVICE | DESCRIPTION | INPUT | OUTPUT |
| --- | --- | --- | --- |
| (9) Message Routing Control | System Configuration | — | Data |
| (10) Antenna Coupler | Coupler Tuning Control | (1) Status<br>(2) Forward Power<br>(3) VSWR | (1) Frequency<br>(2) Mode | while we have described above the principles of our invention in connection with specific apparatus it is to be clearly understood that this description is made only by way of example and not as a limitation to the scope of our invention as set forth in the objects thereof and in the accompanying claims.

We claim:

1. A spread spectrum communication system terminal comprising:
   a first subsystem including
      first means to encode locally generated digital data with an error correcting code,
      second means coupled to said first means for spectrum spreading of said encoded locally generated digital data in at least one mode of operation of said communication system terminal,
      third means to receive remotely generated error correcting code encoded digital data spectrum spread in said one mode of operation, and
      fourth means coupled to said third means to recover said remotely generated digital data;
   said encoded locally generated digital data and said encoded remotely generated digital data being processed in blocks of data bits, a second subsystem including
      fifth means frequency hopping said encoded locally generated digital data prior to transmission to a remote location, and
      sixth means frequency dehopping said encoded remotely generated digital data received from said remote location; and
   a third subsystem including
      seventh means coupled to said second means and said fifth means to provide a predetermined signal for spectrum spreading of said encoded locally generated digital data in said one mode of operation and to couple said encoded locally generated digital data to said fifth means, and
      eighth means coupled to said third means, said fifth means said sixth means to provide a reference frequency for said frequency hopping and said frequency dehopping and to couple said frequency dehopped encoded remotely generated digital data from said sixth means to said third means,
   said first means and second means including
      a first processor coupled to said seventh means,
      a first decision feedback equalizer/canceller coupled to said first processor, and
      a second processor coupled to said first processor and said first decision feedback equalizer/canceller to provide said encoded locally generated digital data, said third means and said four means including
      a third processor and said second processor coupled to said eighth means,
      said first decision feedback equalizer/canceller coupled to said second processor,
      a second decision feedback equalizer/canceller coupled to said third processor, and
      said first processor coupled to said first and second decision feedback equalizer/canceller to recover said encoded remotely generated digital data,
   said first, second and third processors operating according to predetermined data rate algorithms when said locally generated and remotely generated data rates are from 1200–4800 bits per second and spectrum spreading is not provided in the mode of operation of said communication system,
   said first, second and third processors operating according to algorithms providing operation against jamming signals when said locally generated and said remotely generated data rates are below 1200 bits per second and spectrum spreading is provided in this mode of operation of said communication system.

2. A communication system according to claim 1, wherein
   said predetermined signal for spectrum spreading is a pseudo noise sequence.

3. A communication system according to claim 2, wherein
   said eighth means includes
      a satellite synchronized clock continually updated by the NOAA "GOES" satellite, and
      a crystal clock coupled to said satellite synchronized clock to provide said reference frequency.

4. A communication system according to claim 1, further including
   a fourth subsystem including
      ninth means coupled to said seventh means to provide locally generated low bit rate digital speech from a fixed coded vocabulary corresponding to recognized utterances for coupling to said fifth means, and
      tenth means coupled to said eights means to receive remotely generated low bit rate digital speech from said sixth means to synthesize audio signals corresponding to said utterances at said remote location.

5. In a communication system employing frequency hopping and spread spectrum techniques, a modem subsystem comprising:
   first means to encode locally generated digital data with an error correcting code,
   second means coupled to said first means for spectrum spreading of said encoded locally generated digital data in at least one mode of operation of said communication system and to couple resultant digital data to a radio frequency subsystem for frequency hopping,
   third means coupled to said radio frequency subsystem to receive remotely generated error correcting code encoded digital data spectrum spread in said one mode of operation and frequency dehopped in said radio frequency subsystem, and fourth means coupled to said third means to recover said remotely generated digital data, said first means and second means including
- a first processor coupled to a controller subsystem,
- a first decision feedback equalizer/canceller coupled to said first processor, and
- a second processor coupled to said first processor and said first decision feedback equalizer/canceller to provide said encoded locally generated digital data, said third means and said four means including
- a third processor and said second processor coupled to said controller subsystem,
- said first decision feedback equalizer/canceller coupled to said second processor,
- a second decision feedback equalizer/canceller coupled to said third processor, and
- said first processor coupled to said first and second decision feedback equalizer/canceller to recover said encoded remotely generated digital data, said first, second and third processors operating according to predetermined data rate algorithms when said locally generated and remotely generated data rates are from 1200–4800 bits per second and spectrum spreading is not provided in the mode of operation of said communication system, said first, second and third processors operating according to algorithms providing operation against jamming signals when said locally generated and said remotely generated data rates are below 1200 bits per second and spectrum spreading is provided in this mode of operation of said communication system.

6. A modem subsystem according to claim 5, wherein said encoded locally generated digital data and said encoded remotely generated digital data are processed in blocks of data bits.

7. A modem subsystem according to claim 6, wherein said spectrum spreading is accomplished by a pseudo-noise sequence.

8. A modem subsystem according to claim 7, further including
- a timing generator coupled to said first, second and third processors under control of a system clock generator including
  - a satellite synchronized clock continually updated by the NOAA "GOES" satellite, and
  - a crystal clock coupled to said satellite synchronized clock to provide said reference frequency.

* * * * *